US012748378B2

(12) United States Patent
Rho et al.

(10) Patent No.: US 12,748,378 B2
(45) Date of Patent: Sep. 29, 2026

(54) LIGHT MODULATING DEVICE AND OPERATING METHOD THEREOF USING VOLTAGE-VARIED LC

(71) Applicant: POSTECH Research and Business Development Foundation, Pohang-si (KR)

(72) Inventors: Junsuk Rho, Pohang-si (KR); Inki Kim, Pohang-si (KR); Jaehyuck Jang, Goyang-si (KR); Gyeongtae Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 592 days.

(21) Appl. No.: 18/116,720

(22) Filed: Mar. 2, 2023

(65) Prior Publication Data

US 2023/0280694 A1 Sep. 7, 2023

(30) Foreign Application Priority Data

Mar. 2, 2022 (KR) ........................ 10-2022-0027067

(51) Int. Cl.
*G03H 1/22* (2006.01)

(52) U.S. Cl.
CPC ......... *G03H 1/2294* (2013.01); *G03H 1/2205* (2013.01); *G03H 2223/22* (2013.01); *G03H 2225/36* (2013.01); *G03H 2270/30* (2013.01)

(58) Field of Classification Search
CPC ............... G03H 1/2294; G03H 1/0011; G03H 2001/0224; G03H 2250/38; G03H 1/2205;
(Continued)

(56) References Cited

U.S. PATENT DOCUMENTS

| | | | | |
|---|---|---|---|---|
| 2018/0156949 A1* | 6/2018 | Tsai | ...................... | G02B 5/008 |
| 2020/0356047 A1 | 11/2020 | Di Falco et al. | | |
| 2020/0393736 A1 | 12/2020 | Hu | | |

FOREIGN PATENT DOCUMENTS

| | | |
|---|---|---|
| CN | 112799291 A | 5/2021 |
| KR | 1020180065786 | 6/2018 |

(Continued)

OTHER PUBLICATIONS

"Electrically Tunable Multifunctional Polarization Dependent Metasurfaces Integrated with Liquid Crystals in the Visible Region" by Hu et al., Nano Lett, 2021, 21 4554-4562. (Year: 2021).*

(Continued)

*Primary Examiner* — Audrey Y Chang
(74) *Attorney, Agent, or Firm* — CANTOR COLBURN LLP

(57) ABSTRACT

An apparatus for creating a holographic image, comprising: a first polarizing plate; a metasurface configured to create a first holographic image by modulating a polarization state of a light beam passing through the first polarizing plate; a controller configured to supply voltage to a voltage-varied liquid crystal (LC); and the voltage-varied LC configured to create a second holographic image by modulating a polarization state of the first holographic image according to the voltage and operating method thereof are provided.

16 Claims, 21 Drawing Sheets
(5 of 21 Drawing Sheet(s) Filed in Color)

(58) Field of Classification Search
CPC . G02B 2207/101; G02B 27/286; G02B 1/002
USPC .................................................... 359/237, 15
See application file for complete search history.

(56) References Cited

FOREIGN PATENT DOCUMENTS

| | | |
|---|---|---|
| KR | 1020180099992 | 9/2018 |
| KR | 102150883 | 9/2020 |

OTHER PUBLICATIONS

Fei Zhang, et al., "Simultaneous Full-Color Printing and Holography Enabled by Centimeter-Scale Plasmonic Metasurfaces", Advance Science, (2020), pp. 1-10.
Inki Kim, et al., "Stimuli-Responsive Dynamic Metaholographic Displays with Designer Liquid Crystal Modulators", Advanced Materials, (2020), vol. 32, pp. 1-8.
Q. Song, et al., "Bandwidth-unlimited polarization-maintaining metasurfaces", Science Advances, (Jan. 29, 2021), vol. 7, pp. 1-8.
Qinghua Song, et al., "Ptychography retrieval of fully polarized holograms from geometric-phase metasurfaces", Nature Communications, (2020), pp. 1-8.
Inki Kim et al., "Pixelated bifunctional metasurface-driven dynamic vectorial holographic color prints for photonic security platform", Nature Communications (2021), pp. 1-9.
Ping Yu et al., "Electrically Tunable Optical Metasurfaces for Dynamic Polarization Conversion", Nano Letters (2021), vol. 21, pp. 6690-6695.
Ruisi Wang et al., "Electrically driven generation of arbitrary vector vortex beams on the hybrid-order Poincare sphere", Optics Letters, ACS Publications (2018), vol. 43, No. 15, pp. 3570-3573.
Yueqiang Hu et al., "Electrically Tunable Multifunctional Polarization-Dependent Metasurfaces integrated with Liquid Crystals in the Visible Region", Nano Letters, ACS Publications (2021), vol. 21, pp. 4554-4562.

* cited by examiner

LIGHT MODULATING DEVICE AND OPERATING METHOD THEREOF USING VOLTAGE-VARIED LC

CROSS-REFERENCE TO RELATED APPLICATION

This application claims priority to and the benefit of Korean Patent Application No. 10-2022-0027067 filed in the Korean Intellectual Property Office on Mar. 2, 2022, the entire contents of which are incorporated herein by reference.

TECHNICAL FIELD

The present disclosure relates to a lighting modulating device and operating method thereof using a voltage-varied liquid crystal.

BACKGROUND

A hologram refers to a photograph taken with a technique of recording and reproducing information using the interference phenomenon of light caused by a light beam such as laser. A computer-generated hologram (CGH) can calculate phase information to create a desired image through various algorithms. When the calculated phase information is implemented in each pixel, a desired image can be created in space. For example, the phase information calculated according to the CGH algorithm can be implemented by a spatial light modulator (SLM) that controls the phase information of incident light per pixel.

Metamaterial is a material with artificial physical properties that do not exist in nature due to a geometric pattern designed using existing materials. Metasurface is a term derived from the metamaterial and may have various physical properties due to the structural characteristics of a unit structure composing the metasurface. The metasurface enables simultaneous control of multiple degrees of freedom of the light on a nano scale.

However, once the metasurface is fabricated, the properties of the metasurface do not change, so the optical characteristics are also fixed.

SUMMARY

Embodiments provide an apparatus for creating a holographic image

Embodiments provide a light modulating device.

Embodiments provide a method for accessing a server using an light modulation device According to an embodiment, an apparatus for creating a holographic image is provided. The apparatus include: a first polarizing plate; a metasurface configured to create a first holographic image by modulating a polarization state of a light beam passing through the first polarizing plate; a controller configured to supply voltage to a voltage-varied liquid crystal (LC); and the voltage-varied LC configured to create a second holographic image by modulating a polarization state of the first holographic image according to the voltage.

In an embodiment, the first polarizing plate may be a 0° polarizing plate that modulates a polarization state of a light beam to have both a right-circular polarization (RCP) component and a left circular polarization (LCP) component.

In an embodiment, the apparatus may further include a second polarizing plate configured to block the second holographic image according to a polarization state of the second holographic image.

In an embodiment, when the metasurface creates a plurality of first holographic images, the second polarizing plate may block at least one second holographic image among a plurality of second holographic images created through modulation of polarization states of the plurality of first holographic images or may not block the plurality of second holographic images.

In an embodiment, the metasurface may refract a light beam of which a polarization state is modulated into an area of interest and the second holographic image may be formed in the area of interest.

In an embodiment, the metasurface may include a plurality of meta-atoms arranged on a substrate, the arrangement of the plurality of meta-atoms may form a superpixel structure, and one superpixel in the superpixel structure may include a plurality of pixels.

In an embodiment, the plurality of pixels may include at least one meta-atom group and at least one meta-atom group may modulate a right-circular polarization (RCP) component of the light beam into a left-circular polarization (LCP) component or modulate the LCP component of the light beam into the RCP component.

In an embodiment, each of the plurality of pixels may modulate the light beam into a different polarization state.

In an embodiment, when a voltage having a predetermined magnitude is provided by the controller to the voltage-varied LC, the voltage-varied LC may modulate a polarization state of the first holographic image on a plane of a Poincaré sphere.

According to another embodiment, a light modulating device is provided. The light modulating device includes: a substrate configured to support a plurality of meta-atoms; a metasurface layer disposed on the substrate configured to include the plurality of meta-atoms; and a voltage-varied liquid crystal (LC) configured to modulate a polarization state of a holographic image generated by light beams passing through the plurality of meta-atoms.

In an embodiment, a plurality of superpixels in the metasurface layer may be composed of the plurality of meta-atoms, each of the plurality of superpixels may include a plurality of pixels, and the plurality of pixels may determine a polarization state of the light beam and phase information of the light beam, respectively.

In an embodiment, the plurality of pixels may include a first meta-atom group and/or a second meta-atom group, respectively, and a size of a meta-atom included in the first meta-atom group may be different from a size of a meta-atom included in the second meta-atom group.

In an embodiment, a first superpixel and a second superpixel of the plurality of superpixels may include a first pixel that equally modulates a polarization state of the light beam, respectively.

In an embodiment, a location of the first pixel in the first superpixel may be different from a location of the first pixel in the second superpixel.

In an embodiment, the first meta-atom group may modulate the polarization state of the light beam from left-circular polarization (LCP) to right-circular polarization (RCP) and the second meta-atom group may modulate the polarization state of the light beam from the RCP to the LCP.

In an embodiment, meta-atoms in the first meta-atom group may be rotated in clockwise CW direction with respect to neighboring meta-atoms and meta-atoms in the second meta-atom group may be rotated in counter-clockwise CCW direction with respect to neighboring meta-atoms.

In an embodiment, the polarization state of the holographic image may be determined based on a rotation angle of the plurality of meta-atoms and meta-atom groups included in the plurality of pixels.

In an embodiment, the plurality of pixels may include a first meta-atom group and a second meta-atom group and the polarization state may be determined based on a ratio of a number of the first meta-atom group and the second meta-atom group and phase difference between a phase of a light beam refracted by the first meta-atom group a phase of a light beam refracted by the second meta-atom group.

In an embodiment, the phase information may further be determined based on the rotation angle of a first meta-atom in the first meta-atom group or a first meta-atom in the second meta-atom group included in the plurality of pixels.

In an embodiment, the polarization state may correspond to spherical coordinates on a Poincaré sphere and the plurality of pixels may include the first meta-atom group and the second meta-atom group, and a first coordinate component of the coordinate may be determined based on a ratio of a number of the first meta-atom group and the second meta-atom group and a second coordinate component of the coordinate may be determined based on a phase difference between a phase of the light beam refracted by the first meta-atom group and a phases of the light beam refracted by the second meta-atom group.

In an embodiment, a plurality of superpixels in the metasurface layer may be composed of the plurality of meta-atoms, each of the plurality of superpixels may include a plurality of pixels, and a first pixel in a first superpixel of the plurality of superpixels and a second pixel in a second superpixel of the plurality of superpixels may modulate a polarization state of the light beam into a first polarization state.

In an embodiment, a value of a phase of a first light beam modulated by the first pixel may be different from a value of a phase of a second light beam modulated by the second pixel and the first light beam and the second light beam may form a single holographic image in an area of interest.

In an embodiment, the voltage-varied LC may modulate the polarization state of the holographic image generated by the light beam passing through the plurality of meta-atoms based on magnitude of a voltage supplied to the voltage-varied LC.

In an embodiment, a plurality of superpixels in the metasurface layer may be composed of the plurality of meta-atoms, each of the plurality of superpixels may include a plurality of pixels, and when a plurality of holographic images is formed by the plurality of pixels, the voltage-varied LC may modulate a polarization state of a first holographic image by a first pixel of the plurality of pixels and a polarization state of a second holographic image by a second pixel of the plurality of pixels differently from each other.

According to yet another embodiment, a method for accessing a server using an light modulation device is provided. The method includes: receiving a first random number key from the server after requesting access to the server; determining a voltage value corresponding to the first random number key based on a key-voltage conversion relation; obtaining a second random number key by supplying the voltage value to the light modulating device; and access the server using the second random key.

In an embodiment, the method may further include requesting the access to the server using a reflection image on the light modulating device.

In an embodiment, the reflection image may represent a one-dimensional code or two-dimensional code.

In an embodiment, the request of the access may include an identifier of the light modulating device.

In an embodiment, the method may further include receiving the key-voltage conversion relation from the server or updating the key-voltage conversion relation under control of the server.

In an embodiment, the obtaining a second random number key by supplying the voltage value to the light modulating device may include: sequentially supplying a list of the voltage values to the light modulating device when the list of voltage values corresponding to the first random number key is determined; and obtaining the second random number key from a holographic image sequentially output from the light modulating device according to the voltage value.

In an embodiment, the light modulating device may include: a substrate configured to support a plurality of meta-atoms; a metasurface layer disposed on the substrate configured to include the plurality of meta-atoms; and a voltage-varied liquid crystal (LC) configured to modulate a polarization state of a holographic image generated by light beams passing through the plurality of meta-atoms, and the plurality of meta-atoms may compose a plurality of superpixels in the metasurface layer, each of the plurality of superpixels may include a plurality of pixels, each pixel among the plurality of pixels may form a different hologram, and a polarization state of the different holographic images is modulated by the voltage-varied LC

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
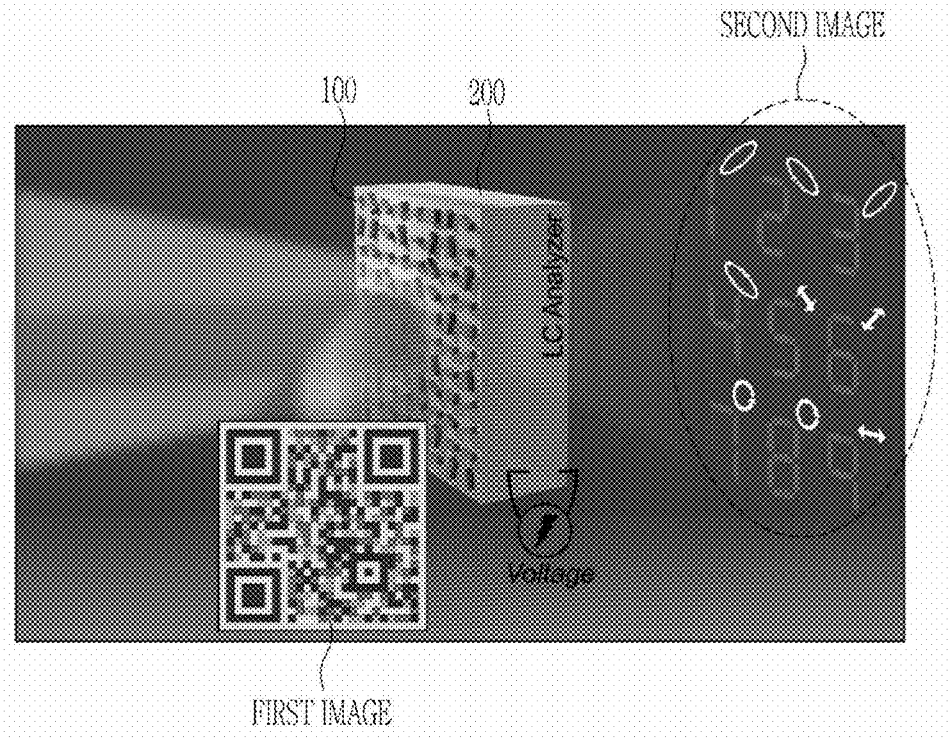
FIG. 1 is a schematic diagram illustrating a light modulating device according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

In this specification, unless explicitly described to the contrary, the word "comprises", and variations such as "including", "containing", or "composing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 2A:
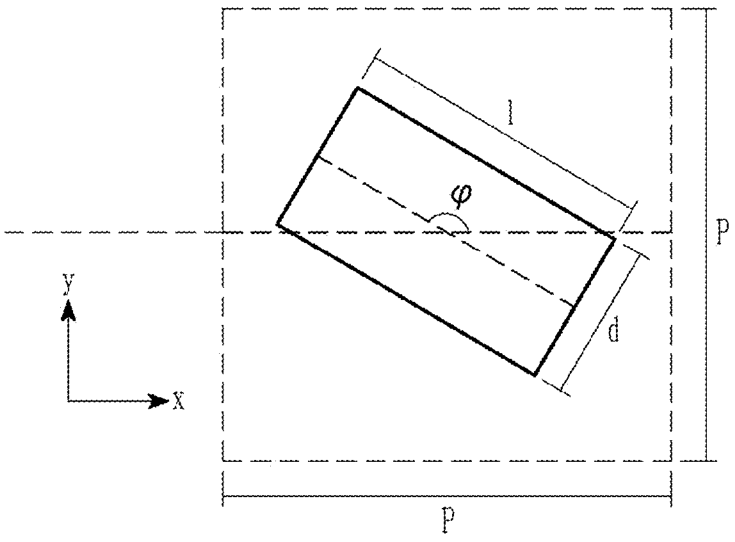
FIG. 2A and FIG. 2B is a schematic diagram illustrating a pillar structure of a metasurface of a light modulating device according to an embodiment.
Figure 2B:
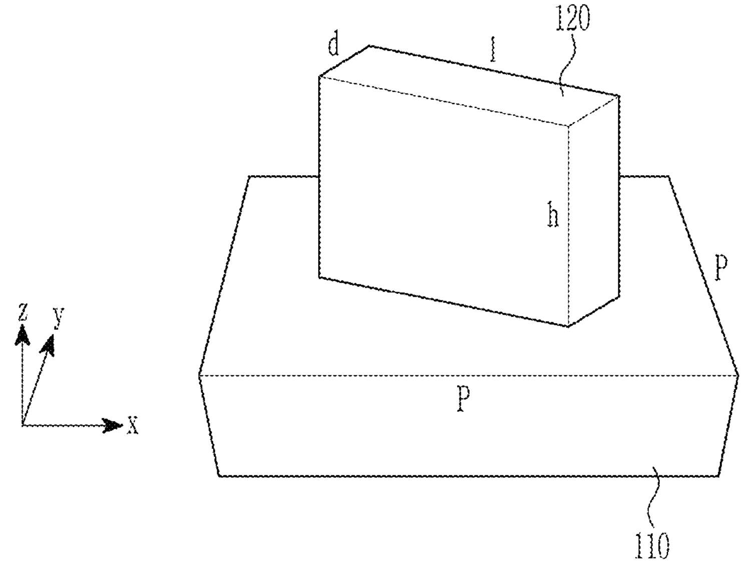

FIG. 1 is a schematic diagram illustrating a light modulating device according to an embodiment and FIG. 2A and FIG. 2B is a schematic diagram illustrating a pillar structure of a metasurface of a light modulating device according to an embodiment.

Referring to FIG. 1, a light modulating device according to an embodiment may include a metasurface 100 and a voltage-varied liquid crystal (LC) 200. The metasurface 100 may include a substrate 110 and an array of pillar structures 120 supported by the substrate 110. Optical characteristics of the metasurface 100 may be controlled by a geometrical size and in-plane rotation angle of the pillar structures at the nanometer scale. In other words, the metasurface 100 may be an optical device including the array of pillar structures with a size smaller than a wavelength of an incident light (e.g., nanometer scale).

The pillar structure of the metasurface 100 may be a plurality of meta-atoms 120 and the plurality of meta-atoms 120 may be included in a layer of the metasurface. The metasurface 100 may display a reflection image (first image) by the array of the meta-atoms 120 in the metasurface 100 and create a penetrated holographic image (second image) by a light beam passing through the metasurface 100. That is, when the metasurface 100 scatters the incident light by resonance of the meta-atom 120 and has the reflection image, the meta-atom 120 may operate as a resonator (e.g., a Mie resonator). When the metasurface 100 modulates phases and/or a polarization state of a light beam incident on the metasurface 100, the meta-atom 120 may operate as a waveguide.

The substrate 110 of the metasurface 100 may be a transparent material that transmits light and may be a conductive material such as indium tin oxide (ITO) or a non-conductive material such as silicon oxide ($SiO_2$). Since the substrate 110 may be made of the transparent material, the meta-atom 120 may be disposed between the substrate 110 and the voltage-varied LC 200 or the substrate 110 may be disposed on a surface opposite to the side in contact with the voltage-varied LC 200. When the meta-atom 120 is disposed between the substrate 110 and the voltage-varied LC 200, i.e., the substrate 110 is disposed on the surface in contact with the voltage-varied LC 200, the reflection image of the metasurface 100 by the meta-atom 120 may be observed through the substrate 110 of the transparent material. Alternatively, when the meta-atom 120 is disposed on the opposite side of the surface in which the substrate 110 contacts the voltage-varied LC 200, the holographic image created by the light beam passes through the meta-atom 120 may pass through the substrate 110 of the transparent material and reach the voltage-varied LC 200.

The meta-atom 120 disposed on one surface of the substrate 110 may be a rectangular pillar having width, length, and height. Structural color of the reflection image represented by the metasurface 100 can be determined according to the width and length of the meta-atom 120. The polarization state of the holographic image created by the metasurface 100 may be determined according to the rotation angle on the plane of the square pillar structure of the meta-atom 120. The meta-atom 120 may be pixelated on the substrate and the pixelation method of the meta-atom 120 is explained in detail below.

Referring to FIG. 2A and FIG. 2B, the meta-atom 120 disposed on the substrate 110 may have width d, length l, and height h. According to an embodiment, a plurality of meta-atoms 120 may be arranged in the metasurface 100 and one meta-atom 120 may be disposed in a square substrate region of length P.

A meta-atom 120 according to an embodiment may be formed of a dielectric material. For example, the meta-atom 120 may be made of silicon on the substrate 110. In order to minimize light absorption in a visible ray region and increase device efficiency (i.e., to improve color generation efficiency and hologram efficiency), various treatments can be applied to the surface of the substrate 110. For example, hydrogenated amorphous silicon (a-Si:H) may be deposited on the surface of the substrate 110 by chemical vapor deposition (CVD) (e.g., PECVD). After the hydrogenated amorphous silicon is deposited on the surface of the substrate 110, a metasurface pattern can be generated by a lithography process (e.g., electron beam (E-beam) lithography).

The meta-atom 120 deposited as the hydrogenated amorphous silicon may exhibit a very low absorption coefficient at a specific wavelength (e.g., 532 nm wavelength) and may show improved device efficiency.

The meta-atom 120 according to another embodiment may be formed of a material that can be penetrated by the ultraviolet rays. For example, niobium pentoxide ($Nb_2O_5$), hafnium oxide ($HfO_2$), silicon nitride (silicon nitride, $SiN_x$), and the like may be used as the meta-atoms through which the ultraviolet rays penetrate. The silicon nitride may be formed on the substrate by optimizing the gas ratio of $SiH_4:N_2$.

The phase of the light beam incident on the metasurface 100 may be modulated as shown in Equation 1 below by the size of the meta-atom 120 and the rotation angle on the plane.

$$\frac{T_L + T_S}{2}\begin{bmatrix} 1 \\ \mp i \end{bmatrix} + \frac{T_L - T_S}{2} e^{\pm i2\varphi(x,y)}\begin{bmatrix} 1 \\ \pm i \end{bmatrix} \qquad \text{(Equation 1)}$$

In equation 1, $T_L$ and $T_S$ may be complex penetration coefficients according to the size of meta-atom 120. When the length of the meta-atom 120 is longer than the width of the meta-atom 120, the $T_L$ is a complex penetration coefficient according to the length of the meta-atom 120 and the $T_S$ is a complex penetration coefficient according to the width of the meta-atom 120. Therefore, the '$T_L+T_S/2$' and '$T_L-T_S/2$' terms in the equation 1 may be coefficients determined according to the size of the meta-atom 120 and may be related to the propagation phase.

In equation 1, φ(x,y) may represent an in-plane rotation angle of the meta-atom 120. Therefore, the term $e^{\pm i2\varphi(x,y)}$ in the equation 1 may be related to a geometry phase determined by the rotation angle of the meta-atom 120.

Figure 3:
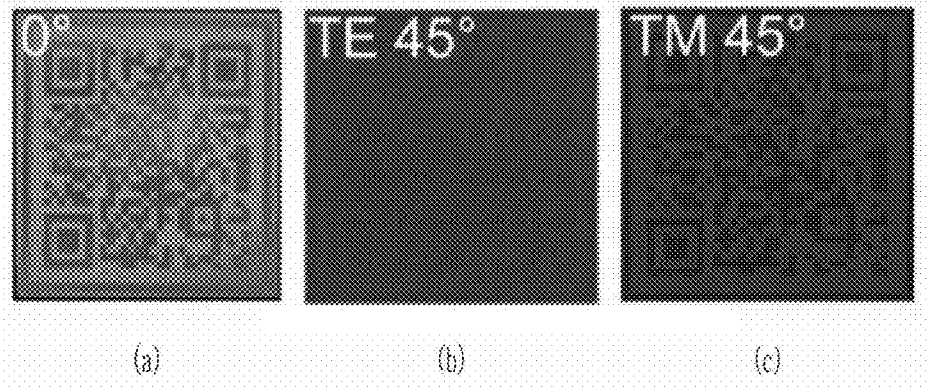
FIG. 3 is an image that appears when the light modulating device reflects light beam according to an embodiment.
Figure 4:
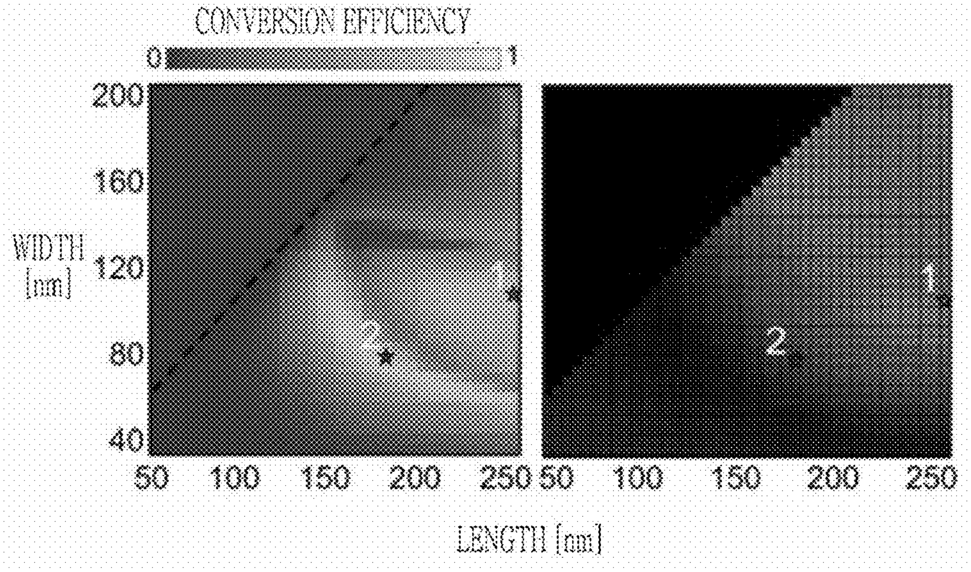
FIG. 4 is a graph illustrating the structural color of the reflection image of the metasurface and the efficiency of polarization conversion based on the size of the meta-atom according to an embodiment.

FIG. 3 is an image that appears when the light modulating device reflects light beam according to an embodiment and FIG. 4 is a graph illustrating the structural color of the reflection image of the metasurface and the efficiency of polarization conversion based on the size of the meta-atom according to an embodiment.

In FIG. 3, (a) is a reflection image that appears when the light beam enters the light modulating device with the incident angle of 0°, that is, is incident vertically into the light modulating device. (b) is a reflection image that appears when the light beam of a transverse electric (TE) mode is incident on the light modulating device. (c) is a reflection image that appears when the light beam of a transverse magnetic (TM) mode is incident on the light modulating device.

Referring to FIG. 3, the color of the reflection image of (a), (b), and (c) may be different from each other and the color of the reflection image represented by the metasurface 100 may vary depending on the width and length of the meta-atom 120.

Referring to FIG. 4, the conversion efficiency of polarization according to the size of the meta-atom and the structural colors of the reflection image of the metasurface in the incident light of 532 nm are shown.

Referring to the graph on the right of FIG. 4, various structural colors of the reflection image may appear in the length range 50-250 nm and width range 40-200 nm of the meta-atom 120.

Referring to the graph on the left of FIG. 4, the conversion efficiency of the polarization of the meta-atom 120 in the width range 40-200 nm and the length range 50-250 nm is shown. Since sharpness of the penetrated holographic image may be determined according to the conversion efficiency of the polarization when the meta-atom 120 of the metasurface 100 performs a function as a waveguide, a meta-atom 120 with high polarization conversion efficiency may be selected among the meta-atoms 120 representing different structural colors.

The metasurface 100 according to an embodiment may include meta-atoms 120 of two different sizes, position 1 and position 2 in the graph of the left of FIG. 4. Two sizes of meta-atom 120 that represents orange and cyan in the left graph of FIG. 4 may be selected among the positions where the polarization efficiency is close to 1 in the right graph of FIG. 4. This is one example, and among meta-atoms having different colors, a plurality of meta-atoms with the high polarization conversion efficiency and different sizes may be used to represent the reflection image.

Figure 5A:
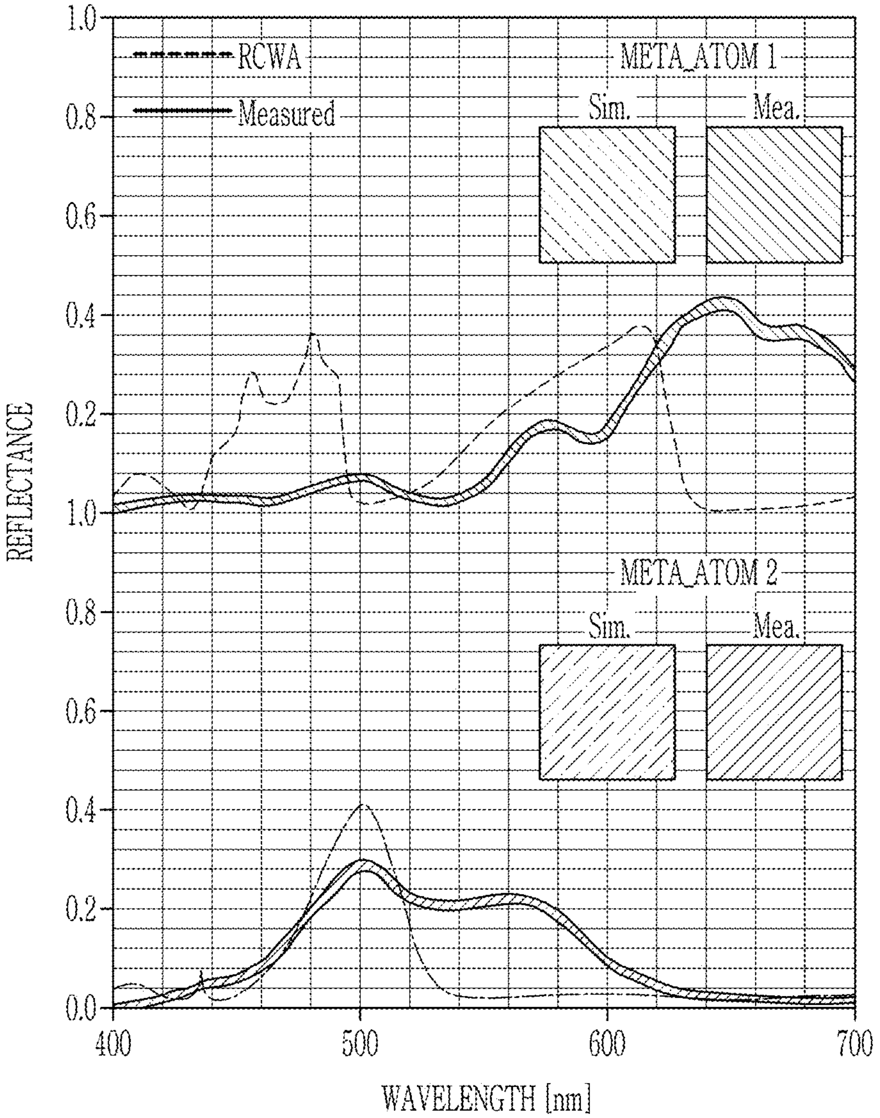
FIG. 5A is a graph showing a result of RCWA according to an embodiment.
Figure 5B:
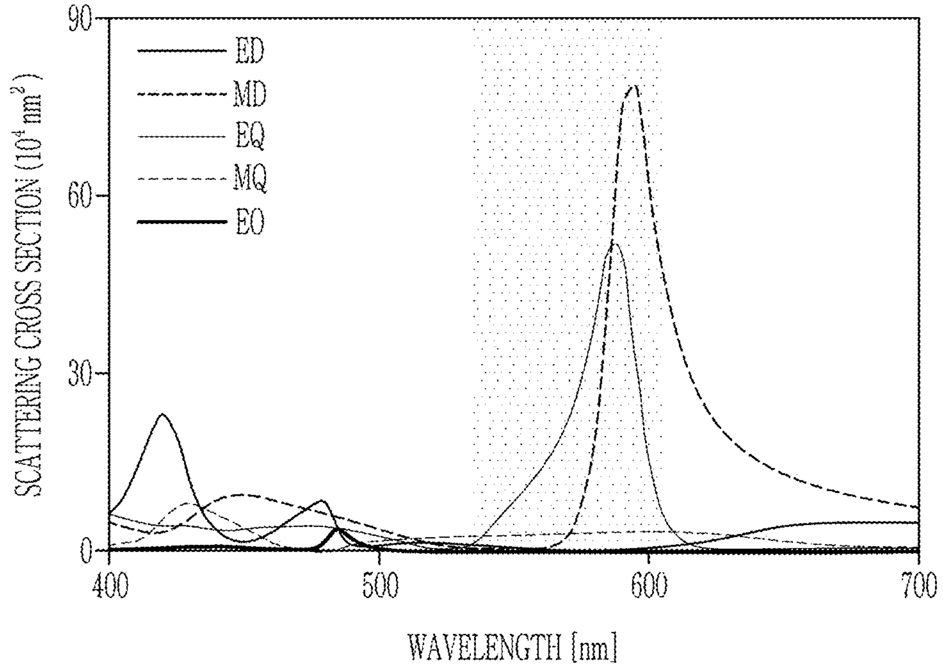
FIG. 5B is a graph showing a result of multipole expansion analysis according to an embodiment.
Figure 5C:
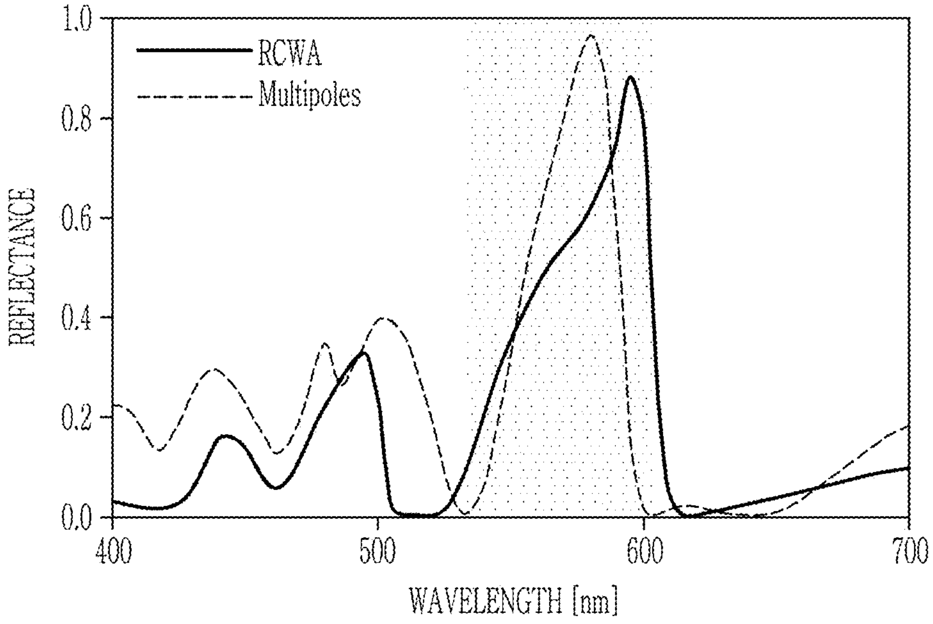
FIG. 5C is a graph showing that the results of the RCWA and multipole expansion analysis according to an embodiment are consistent.

FIG. 5A is a graph showing a result of RCWA according to an embodiment, FIG. 5B is a graph showing a result of multipole expansion analysis according to an embodiment, and FIG. 5C is a graph showing that the results of the RCWA and multipole expansion analysis according to an embodiment are consistent.

Referring to FIG. 5A, it is shown through rigorous coupled-wave analysis (RCWA) at which wavelength (horizontal axis) each meta-atom 120 exhibits the highest reflectance (vertical axis). The RCWA is shown over all visible ray wavelengths and the RCWA may be measured by a spectrometer. The wavelength band in which meta-atom 1 and meta-atom 2 show the highest reflectance, respectively, may determine the structural colors of the reflection image. In FIG. 5*a*, it may be seen that a color similar to the structural color of each meta-atom predicted by the RCWA is obtained as a result of the experiment.

Referring to FIG. 5B, it is shown that a strong interaction of magnetic dipole (MD) and electric quadrupole (EQ) is observed in the wavelength band of about 540 nm to 610 nm through the multipole expansion analysis. Referring to FIG. 5C, it may be seen that the results of numerical analysis by the RCWA and the multipole expansion for the reflection spectrum of the selected meta-atom 120 are consistent with each other.

Figure 6:
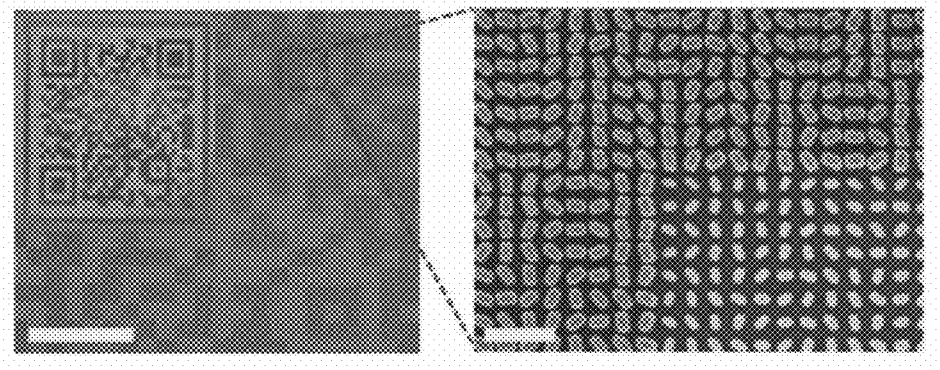
FIG. 6 is an enlarged diagram illustrating a metasurface of a light modulating device according to an embodiment.
Figure 7:
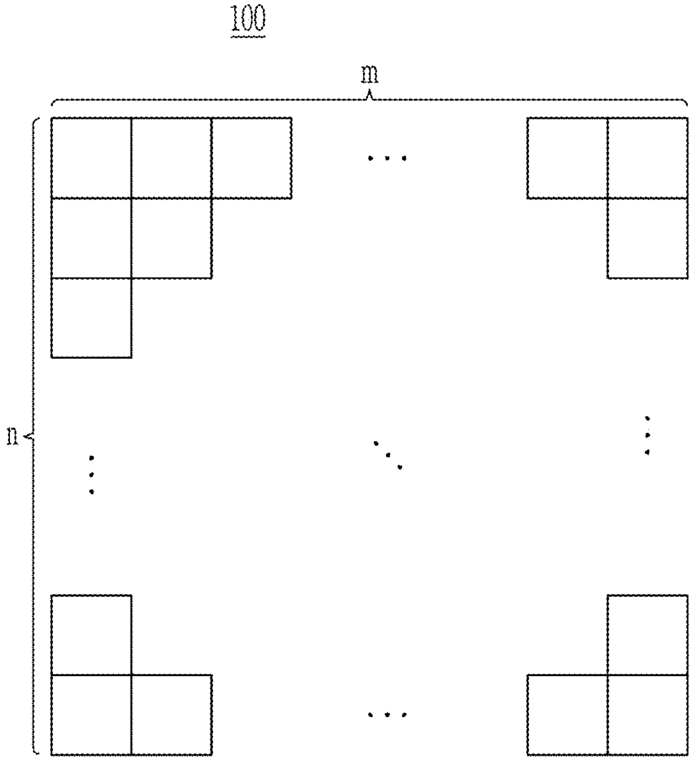
FIG. 7 is a schematic diagram illustrating a metasurface according to an embodiment.
Figure 8:
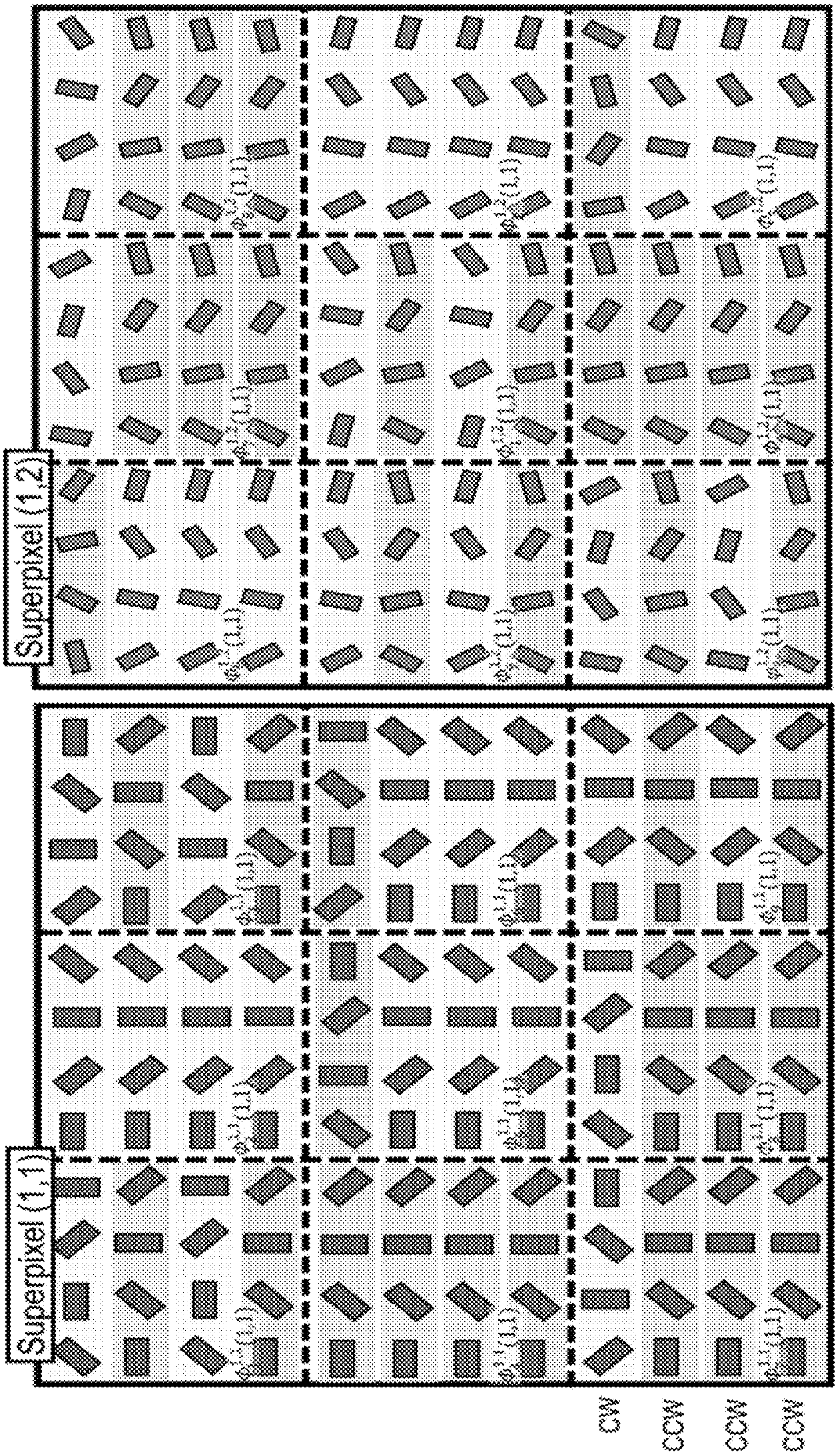
FIG. 8 is a schematic diagram illustrating a superpixel structure of the metasurface according to an embodiment.

FIG. 6 is an enlarged diagram illustrating a metasurface of a light modulating device according to an embodiment, FIG. 7 is a schematic diagram illustrating a metasurface according to an embodiment, and FIG. 8 is a schematic diagram illustrating a superpixel structure of the metasurface according to an embodiment.

Referring to FIG. 6, the metasurface 100 representing a reflection image in the visible ray region may include a plurality of meta-atoms 120 in nano scale and the plurality of meta-atoms 120 are pixelated in the metasurface layer.

Referring to FIG. 7, the metasurface 100 according to an embodiment may include a plurality of superpixels. In FIG. 8, the superpixels included in the metasurface 100 may be arranged in the form of an n×m matrix.

Referring to FIG. 8. One superpixel may include a plurality of pixels, and a plurality of meta-atoms 120 are arranged in each pixel. That is, a plurality of superpixels is composed of the plurality of meta-atoms in the metasurface layer. The polarization state of light incident on the metasurface 100 may be modulated by the meta-atom arranged in each pixel.

The number of polarization states of the holographic image that the metasurface 100 represents may be determined according to the number k of pixels included in one superpixel according to an embodiment. For example, when each superpixel of the metasurface 100 includes k pixels, a holographic image by the light beam passing through the metasurface 100 may include k polarization states. Then, the pixels in each superpixel of the metasurface 100 may correspond to parts having different polarization states in the holographic image. That is, the polarization state of each part in the holographic image may be determined by each pixel in the metasurface 100.

Referring to FIG. 7 and FIG. 8, the metasurface may include n×m superpixels and each superpixel may include the plurality of pixels. For example, in FIG. 8, nine pixels are included in one superpixel. Each pixel may include a plurality of meta-atom groups and each meta-atom group may include a plurality of meta-atoms.

The number of pixels in a superpixel may determine the number of images with different polarization states. As shown in FIG. 8, when each superpixel includes 9 pixels, there may be up to nine holographic images with different polarization states created by the light beam passing through the metasurface.

The penetrated holographic image by the light beam passing through the metasurface according to an embodiment may be created in an area of interest. For example, 9 different penetrated holographic images having nine different polarization states may be displayed in different areas of interest. In order to create the metasurface according to an embodiment, it is necessary to determine the polarization state of light beam to be transmitted to the area of interest and to design a holographic image to be created by the light beam transmitted to the area of interest.

Figure 9:
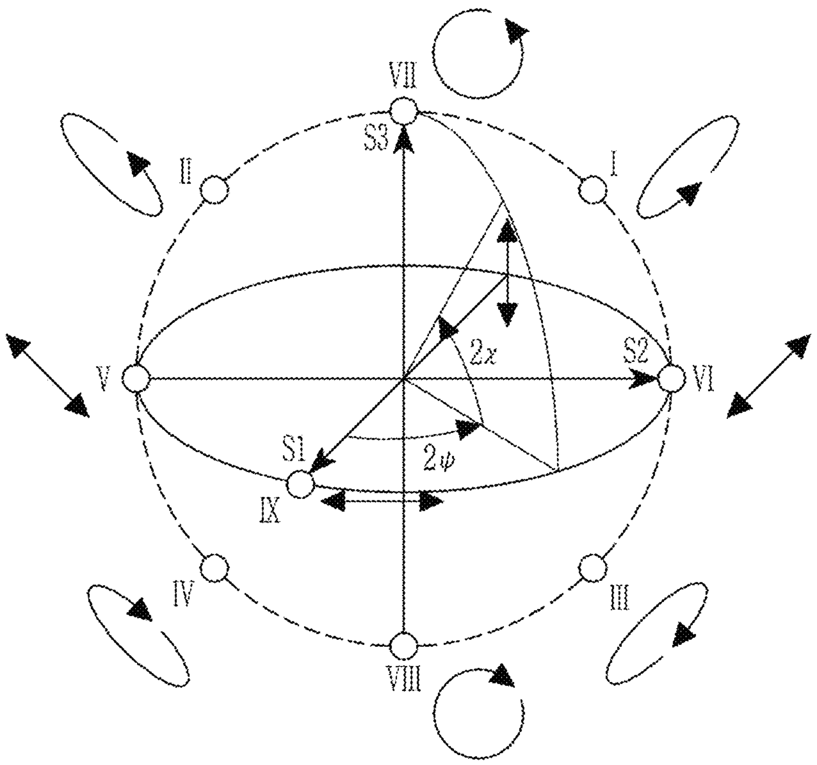
FIG. 9 is a diagram illustrating a Poincaré sphere in which a polarization state modulated by one pixel is represented according to an embodiment.

The polarization state of the light beam to be sent to the area of interest may be determined by one pixel. For example, when a superpixel includes 9 pixels, the superpixel may direct the light beam having nine different polarization states to the area of interest. The polarization state of the light beam passing through the metasurface may be expressed by a spherical coordinate system of a Poincaré sphere, as shown in FIG. 9.

The position of a point on the spherical coordinate system can be determined by three coordinate information—radius, ψ, χ—. The radius may not be considered because they are all the same. If all ψ (rotation angle on the horizontal plane (S1-S2 plane)) and χ (rotation angle on the vertical plane (S1-S3 plane or S2-S3 plane) can be implemented by a metasurface, then all point positions on the spherical coordinate system can be determined and all polarization states can be modulated through the metasurface.

A pixel according to an embodiment may be designed as follows to implement arbitrary ψ, χ.

Each pixel may include a plurality of meta-atom groups. Referring to FIG. 8, one pixel includes 4 meta-atom groups. Each meta-atom group may include a plurality of meta-atoms. Referring to FIG. 8, one meta-atom group includes 4 meta-atoms.

According to an embodiment, the meta-atom in one pixel may send a light beam having an intended polarization state to an area of interest by refracting incident light.

Depending on the polarization state (RCP or LCP) of the refracted light beam, the meta-atom may be grouped into a clockwise (CW) group or a counterclockwise (CCW) group.

According to an embodiment, each meta-atom group included in each pixel may modulate the incident light into different polarization states and a holographic image may be created by overlapping light beams modulated by each meta-atom group. For example, when a CW meta-atom group and b CCW meta-atom groups are included in one pixel, a hologram (whole or partial) having one polarization state may be created through overlapping of the light beam modulated by the a CW meta-atom group and the light beam modulated by the b CCW meta-atom group.

Referring to FIG. 8, the first pixel (i.e., pixel at (1,1) position) in the first superpixel includes two CW meta-atom groups and two CCW meta-atom groups (a=2, b=2). The seventh pixel (i.e., pixel at (3,1) position) in the first superpixel includes one CW meta-atom group and three CCW meta-atom groups (a=1, b=3). According to an embodiment, the polarization state of the light beam passing through the metasurface 100 may be determined according to a ratio of meta-atom groups included in each pixel and a relative angle of the meta-atoms between meta-atom groups.

In FIG. 8, two adjacent superpixels including meta-atoms of different sizes is illustrated. Although two meta-atoms 120 having the same polarization conversion efficiency is determined to implement the reflection image with different structural colors above, in order to implement a penetrated holographic image, a phase modulation value that increases or decreases due to the size of the meta-atom 120 needs to be compensated. In other words, since the phase modulation value of different meta-atoms is changed by the '$T_L - T_S/2$' term on the right side of equation 1 (a term according to the magnitude of the length and width of the meta-atom 120), the in-plane rotation angle of each meta-atom 120 needs to be compensated.

The phase part of the complex '$T_L - T_S/2$' term may be the part of the propagation phase α(x,y) that needs to be compensated before implementing the phase of the hologram. Considering the propagation phase term, the phases to be delayed by the rotation (distortion) of the two meta-atoms may be $\alpha_1(x,y) \pm 2\varphi(x,y)$ and $\alpha_2(x,y) \pm 2\varphi(x,y)$. Here, the + symbol represents right-circular polarization (RCP) and the − symbol represents left-circular polarization (LCP). The difference in the propagation phase of two meta-atoms with different sizes is $\alpha_2(x,y) - \alpha_1(x,y)$, so the compensation rotation value is as shown in Equation 2 below.

$$\frac{\alpha_2(x, y) - \alpha_1(x, y)}{2} \quad \text{(Equation 2)}$$

Table 1 below shows the phase modulation size of the superpixel for which the difference in the propagation phase is compensated.

TABLE 1

| | | second superpixel | first superpixel |
|---|---|---|---|
| CW meta-atom group | Before compensation | $\alpha_1(x, y) + 2\varphi(x, y)$ | $\alpha_2(x, y) + 2\varphi(x, y)$ |
| | After compensation | $\alpha_1(x, y) + 2\frac{\alpha_2(x, y) - \alpha_1(x, y)}{2} + 2\varphi(x, y)$ | $\alpha_2(x, y) + 2\varphi(x, y)$ |
| CCW | Before | $\alpha_1(x, y) + 2\varphi(x, y)$ | $\alpha_2(x, y) +$ |

TABLE 1-continued

| | | second superpixel | first superpixel |
|---|---|---|---|
| meta-atom group | compensation | | 2φ(x, y) |
| | After compensation | $\alpha_1(x, y) + 2\frac{\alpha_2(x, y) - \alpha_1(x, y)}{2} + 2\varphi(x, y)$ | $\alpha_2(x, y) + 2\varphi(x, y)$ |

For example, when the length L1 of the first superpixel is 175 nm, the width W1 of the first superpixel is 65 nm, the length L2 of the second superpixel is 250 nm, and the width of the second superpixel W2 is 95 nm, since initial propagation phase $\alpha_1$(x,y) of the first superpixel is 1.731 and initial propagation phase $\alpha_2$(x, y) of the second superpixel is 3.757, the propagation phase difference $\alpha_2$(x, y)−$\alpha_1$(x, y) between the two superpixels is 2.026 rad (116°). Since the phase is delayed by twice the rotation angle of the meta-atom, the compensation phase value is 58° according to equation 2.

Figure 11:
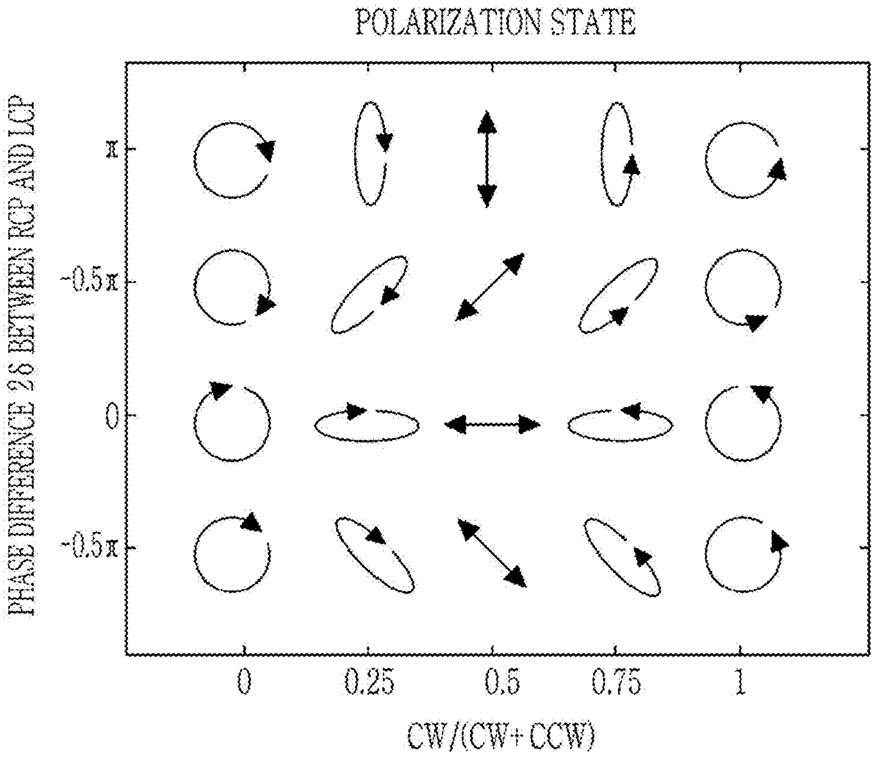
FIG. 11 is a schematic diagram illustrating change in polarization state according to a ratio of the meta-atom groups included in one pixel and a phase difference between the phase difference of the light beams passing through the two meta-atom groups according to an embodiment.

FIG. 9 is a diagram illustrating a Poincaré sphere in which a polarization state modulated by one pixel is represented according to an embodiment, FIG. is a schematic diagram illustrating a method for modulating the polarization state by one meta-atom group according to an embodiment, and FIG. 11 is a schematic diagram illustrating change in polarization state according to a ratio of the meta-atom groups included in one pixel and a phase difference between the phase difference of the light beams passing through the two meta-atom groups according to an embodiment.

According to an embodiment, a polarization state modulated by each pixel may be represented on a Poincare sphere. Referring to FIG. 9, nine points on the Poincaré sphere correspond to the polarization state modulated by each pixel included in one superpixel. In the nine points, eight points (I to VIII) are positioned on the S2-S3 plane of the Poincaré sphere and one point (IX) is positioned on the S1 axis.

The arrow displayed next to each point may indicate the polarization state indicated by the corresponding point. For example, point I is an elliptical polarization state that rotates in the counterclockwise direction. If one of the pixels included in the superpixel corresponds to the point I, the pixel may modulate the polarization state of incident light beam into the elliptical polarization state. Alternatively, point VIII is a left circular polarization state that rotates in the clockwise direction. If one of the pixels included in the superpixel corresponds to the point VIII, the pixel may modulate the polarization state of incident light beam into the left circular polarization state.

The polarization state by one pixel may correspond to coordinates on the Poincaré sphere. Referring to FIG. 9, the coordinates on the Poincaré sphere may be expressed as the rotation angle ψ on the S1-S2 plane and the rotation angle χ on the S2-S3 plane. The coordinates (2ψ,2χ) on the Poincaré sphere may be determined by equations 3 and 4 below.

$$2\psi = 2\delta \quad \text{(Equation 3)}$$

$$2\chi = \sin^{-1}\frac{a_R^2 - a_L^2}{a_R^2 + a_L^2} \quad \text{(Equation 4)}$$

In equation 3, δ is a difference of the rotation angle between the corresponding meta-atoms in each meta-atom group included in one pixel. That is, δ may represent the difference of the rotation angle between the meta-atom in the CW meta-atom group and the meta-atom in the CCW meta-atom group.

For example, when the difference of the rotation angle between the first meta-atom in the CW meta-atom group and the first meta-atom in the CCW meta-atom group is δ, the difference of the rotation angle between the remaining corresponding meta-atoms are also δ. Alternatively, $2^\delta$ may be a phase difference between a phase of a light beam refracted by the CW meta-atom group and a phase of a light beam refracted by the CCW meta-atom group.

Figure 10:
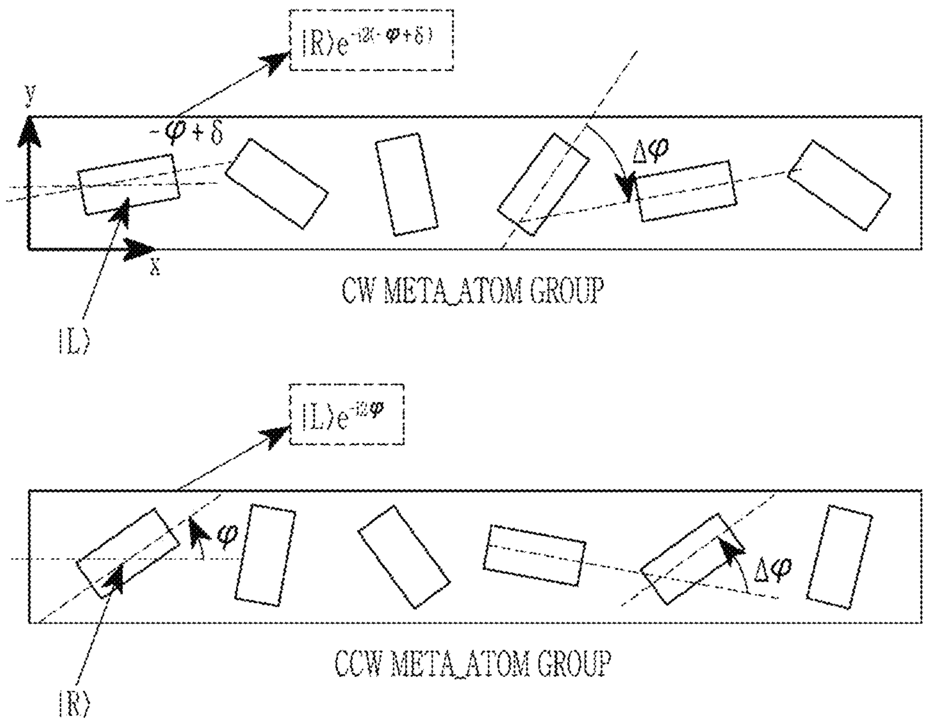
FIG. 10 is a schematic diagram illustrating a method for modulating the polarization state by one meta-atom group according to an embodiment.

Referring to FIG. 10, adjacent meta-atoms in the meta-atom groups may be distorted by the relative rotation angle Δφ. In FIG. 10, the relative rotation of the meta-atoms in the CW meta-atom group may be the sequentially clockwise direction (the −x direction) and the relative rotation of the meta-atoms in the CCW meta-atom group may be the sequentially counterclockwise direction (the +x direction). A plurality of meta-atoms relatively rotating in the clockwise or counterclockwise may refract the incident light beam to the area of interest. The angle of refraction $\theta_d$ of the light beam may be determined according to equation 5 below.

$$\theta_d = \arcsin\left(\frac{2\Delta\varphi}{k_0 P}\right) \quad \text{(Equation 5)}$$

In equation 5, $k_0$ is the propagation constant of light and P is the period (or interval, see FIG. 2A and FIG. 2B) of each meta-atom. Therefore, as the relative rotation angle Δφ between meta-atoms increases, the refraction angle $\theta_d$ may also increase. A plurality of meta-atoms relatively rotating in the clockwise may modulate the polarization state of the light beam, that is, modulate LCP light beam into RCP light beam, and refract the modulated RCP light beam to the area of interest. A plurality of meta-atoms relatively rotating in the counterclockwise may modulate the RCP light beam into the LCP light beam and refract the modulated LCP light beam to the area of interest.

Each meta-atom of the metasurface according to an embodiment may refract the wavefront of the light wave by delaying the phase of the light beam to a different value. The meta-atom may use 'geometric phase' as a phase modulation method. According to the geometric phase, when the LCP light beam is incident on the metasurface including the meta-atoms with relative rotation, one meta-atom group may delay the phase of the light beam component that has been converted to the RCP by twice the relative rotation angle. When the RCP light beam is incident, the phase of the light beam component converted to the LCP may be delayed (negative direction). Referring to FIG. 10, when linearly polarized (RCP+LCP) light beam, that is, light beam including both RCP and LCP components is incident, the clockwise group may convert the LCP component of the incident linearly polarized light beam into the RCP and refract the RCP light beam to the area of interest and may convert the RCP component of the incident linearly polarized light beam into the LCP and refract the LCP light beam in the opposite direction of the area of interest. By the counterclockwise group, the RCP component of the incident linear polarization may be modulated into the LCP and propagated to the area of interest and the LCP component of the incident linear polarization may be modulated into the RCP and propagated to the opposite direction of the area of interest. That is, the clockwise (CW) group may send the RCP light beams to the area of interest and the counterclockwise (CCW) group may send the LCP light beams to the area of interest. The light beams refracted on the metasurface may then be formed at the area of interest.

In equations 3 and 4, all polarization states defined by ψ and λ may be implemented through the intensity and phase difference of the RCP and the LCP. Equation 3 represents the result according to the phase difference between the light beams refracted in each meta-atom group and equation 4 represents the result according to the difference in intensity of the light beams refracted in each meta-atom group.

The difference in intensity between the RCP light beam and the LCP light beam may be determined based on the number of the CW groups and the CCW groups in one pixel. When there are four groups in one pixel, such as FIG. 8, the intensity of the RCP light beams and the LCP light beams may be determined based on the number ratio of the CW groups and the CCW groups, 0:4, 1:3, 2:2, 3:1, and 4:0.

Referring to FIG. 10, the phase difference between the RCP light beam and the LCP light beam may be determined based on the rotation angle difference of the corresponding meta-atoms in each meta-atom group. Since the exponential part of the equation 1 representing the light beam corresponds to the phase of the light beam, the phase difference between the RCP light beam passing through the CW meta-atom group and the LCP light beam passing through the CCW meta-atom group may be $2^{\delta}$.

Referring to FIG. 10, the polarization state of the light beam may be modulated to the LCP after the light beam passes through the CCW meta-atom group. The polarization state of the light beam passing through the CW meta-atom group may be modulated to the RCP. The first meta-atom of the CCW meta-atom group may be rotated by an angle φ with respect to the horizontal axis (i.e., the direction in which the meta-atoms are listed in the meta-atom group). In addition, the first meta-atom of the CW meta-atom group may be rotated by an angle −φ+δ with respect to the horizontal axis (x axis).

Specifically, the RCP component of the light beam may be modulated to $|L>e^{i2\varphi}$ according to the in-plane rotation angle of the meta-atoms of the CCW meta-atom group. $e^{i2\varphi}$ term may represent the phase component added when the polarization state is modulated. In addition, the LCP component of the light beam may be modulated to the RCP light beam $|R>e^{-i2(-\varphi+\delta)}$ according to the rotation angle difference δ between the meta-atoms of the CW meta-atom group and the meta-atoms of the CCW meta-atom group. Here, the $e^{-i2(-\varphi+\delta)}$ term may represent the phase component added when the polarization state is modulated.

Referring to FIG. 10, the relative rotation angle between neighboring meta-atoms 120 in each meta-atom group is twisted from each other by an angle Δφ. For example, the rotation angle of the second meta-atom in one meta-atom group is rotated more than the rotation angle of the first meta-atom by an angle Δφ and the rotation angle of the third meta-atom is rotated more than the rotation angle of the second meta-atom by an angle Δφ.

The relative rotation angle Δφ between each meta-atom may be determined according to the number of meta-atoms 120 included in a meta-atom group. Referring to FIG. 9, since one meta-atom group contains four meta-atoms 120, the relative rotation angle Δφ is π/4. Therefore, when the number of meta-atoms 120 included in one meta-atom group is 2, 4, 6, and 8, the relative rotation angle Δφ is π/2, π/4, π/6, and π/8, respectively. Refraction angles of the light beams refracted by the metasurface 100 may be 62.5°, 26.3°, 17.2°, and 12.8°, respectively. According to an embodiment, when the number of meta-atoms 120 included in one meta-atom group is 8, since the intensity of light beams refracted from the metasurface 100 is the highest (deflection efficiency is the best), but the refraction angle is the smallest and the distance is close to the light that is transmitted as it is without bending, therefore, the clarity and sharpness of the holographic image created by the metasurface 100 may be the lowest. Accordingly, the number of meta-atoms 120 included in one meta-atom group may be 4 or 6.

The relative rotation angle of each meta-atom 120 in the CW meta-atom group is −Δφ, and therefore, the relative rotation direction of each meta-atom 120 in the CW meta-atom group is the clockwise direction. The relative rotation angle of each meta-atom 120 in the CCW meta-atom group is +Δφ, and therefore, the relative rotation direction of each meta-atom 120 in the CCW meta-atom group is the counterclockwise direction.

Meanwhile, in equation 4, $\alpha_B$ represents the intensity of the RCP beam and $\alpha_B$. represents the intensity of the LCP beam. Here, when a light beam passes through the CW meta-atom group, it is modulated into the RCP light beam, so $\alpha_B$ may be proportional to the number of CW meta-atom groups included in one pixel. Similarly, since a light beam passing through a CCW meta-atom group is modulated into the LCP light beam, $\alpha_L$ may be proportional to the number of CCW meta-atom groups included in one pixel.

Referring to equation 4, coordinates χ on the Poincaré sphere may be determined according to the ratio of the number of CW meta-atom groups and the number of CCW meta-atom groups included in one pixel. Here, since only the CW meta-atom groups or only the CCW meta-atom groups may be included in one pixel, a and b in the number ratio a:b between meta-atom groups may be integers greater than or equal to 0.

For example, as shown in FIG. 8, when one pixel includes four meta-atom groups, when the ratio of the number of CW meta-atom groups to CCW meta-atom groups is 1:1, the coordinates $2^{\chi}$ on the Poincaré sphere are 0 or π and the polarization state of the light beam passing through corresponding pixel may be modulated into a polarization state having 0 for the χ coordinate on the Poincaré sphere determined according to the ratio of the number of meta-atom groups. Alternatively, when the ratio of the number of CW meta-atom groups to CCW meta-atom groups in one pixel is 4:0, the $2^{\chi}$ coordinates on the Poincaré sphere are π/2 or 3π/2 and the polarization state of the light beam passing through the pixel may be modulated into a polarization state with π/2 or 3π/2 for the phase 2 coordinate.

For example, since the first pixel of the first superpixel (superpixel (1,1)) includes two CW meta-atom groups and two CCW meta-atom groups, according to equation 4, the coordinate 2χ is 0. That is, a polarization state of light beams modulated by a pixel including two CW meta-atom groups and two CCW meta-atom groups may be positioned on the S1-S2 plane of the Poincaré sphere. Referring to FIG. 11, when the number of CW meta-atom groups included in one pixel is the same with the number of CCW meta-atom groups included in the pixel, CW/(CW+CCW) is 0.5, which may indicate a linear polarization state.

Since only four CW meta-atom groups are included in the second pixel of the first superpixel (superpixel (1,2)), the coordinate 2χ is π/2 according to equation 4. That is, a polarization state modulated by a pixel including four CW meta-atom groups may be point VII of the Poincaré sphere.

Referring to FIG. 11, when there is only CW meta-atom groups in one pixel, CW/(CW+CCW) is 1, which may be the point VII with the RCP.

The light beams of different polarization states transmitted to the area of interest may create the holographic images with the method below.

The number of polarization states of light beam propagated to the area of interest by one superpixel among a plurality of superpixels on the metasurface may be determined by the number of pixels in the superpixel. For example, when 9 pixels are included in a superpixel, the light beam with 9 different polarization states may be transmitted to the area of interest.

When there are n×m superpixels on the metasurface, the number of light beams with the first polarization state among the light beams reaching the area of interest is n×m. Similarly, the number of light beam with the second polarization state to the ninth polarization state is also n×m. For example, a pixel producing a light beam with a first polarization state may be called a first pixel.

When n×m light beams having the first polarization state propagated to the area of interest have different phases at the area of interest, the holographic image may be created at the area of interest. The phase information of n×m light beams with the first polarization state may be calculated through a CGH algorithm from the holographic image to be formed at the area of interest. As the CGH algorithm, the Gerchberg-Saxton (GS) algorithm may be used. The GS algorithm is an algorithm composed of Fourier transform and inverse Fourier transform and is a calculation method that approximates the propagation of light by the Fourier transforms. The calculated phase information may be determined in the form of an n×m matrix.

The rotation angle of the meta-atom in the meta-atom group of each pixel may be determined according to the phase information to be assigned to the light beam by each pixel. That is, the rotation angle of the meta-atom may determine the phase information of the light beam penetrating the metasurface. Referring to FIG. 10, when the rotation angle (with respect to the horizontal line, x-axis) of the first meta-atom in the CW meta-atom group is $-\varphi+\delta$, the phase value of the light beam modulated by the CW meta-atom group may be $-i2(-\varphi+\delta)$. When the rotation angle (with respect to the horizontal line, x-axis) of the first meta-atom in the CCW meta-atom group is $\varphi$, the phase value of the light beam modulated by the CCW meta-atom group may be $i2\varphi$. That is, since the first meta-atoms in the meta-atom group of pixels that modulate the light beam into the same polarization state are rotated to different sizes with respect to the horizontal line, corresponding pixels in the superpixel may assign different phase information to the light beam. For example, referring to FIG. 8, when the pixels ($pixel_{1,1}(1,2)$) at the position of the 1st row and 2nd column in the super pixel (1,1) and the pixel ($pixel_{1,2}(2,3)$) at the position of the 2nd row and 3rd column in the super pixel (1,2) may modulate the light beam into the same polarization state, the rotation angle of the first meta-atom of the meta-atom group in each pixel may be different. Therefore, the light beam passing through the metasurface may have phase values of different sizes while being modulated into the same polarization state by the $pixel_{1,1}(1,2)$ and $pixel_{1,2}(2,3)$.

As described above, each pixel in a superpixel according to an embodiment may determine the polarization state and phase information of the light beam. For example, the first pixel included in every n×m superpixel may form one holographic image in the area of interest, the polarization states of n×m light beam passing through the n×m first pixels are all the same (first polarization state), and the phase information may all be different. The phase information of n×m light beams having the first polarization state may be determined by the first pixel and n×m light beams having the first polarization state and having different phase information may form one holographic image at the area of interest.

The n×m light beams with the first polarization state may have the phase information in the form of n×m matrix determined by the CGH algorithm while passing through the metasurface. Thereafter, n×m light beams with first polarization state having the phase information determined by the CGH algorithm may form a holographic image having the first polarization state at the area of interest. The n×m number of first pixels may implement the calculated phase information through a geometric phase or Pancharatnam-Berry (PB) phase. The geometric phase is a method for delaying the phase by twice the meta-atom rotation angle.

When one superpixel includes nine pixels, n×m first pixels included in each of n×m superpixels may create a holographic image with the first polarization state at the area of interest and n×m second pixels to ninth pixels included in each of n×m superpixels may create holographic images with second to ninth polarization states at the area of interest. The position of a plurality of pixels (e.g., first pixel to ninth pixel) may be randomly determined in each superpixel. When the position of the first pixel in one superpixel is (1,1), the position of the first pixel in the neighboring superpixel may be a position other than (1,1). That is, the position of the first pixel in one superpixel may be different from the position of the first pixel in another superpixel. The first pixel in one superpixel and the first pixel in another superpixel different from the one superpixel may be pixels that modulate the light beam into the same polarization state.

If the positions of pixels that modulate the light beam with the same polarization state are not randomly mixed in the superpixels (i.e., if the positions of pixels that identically modulate the polarization state of the light beam are the same in the superpixels), high-order diffraction may cause multiple holographic images at the area of interest.

Figure 12A:
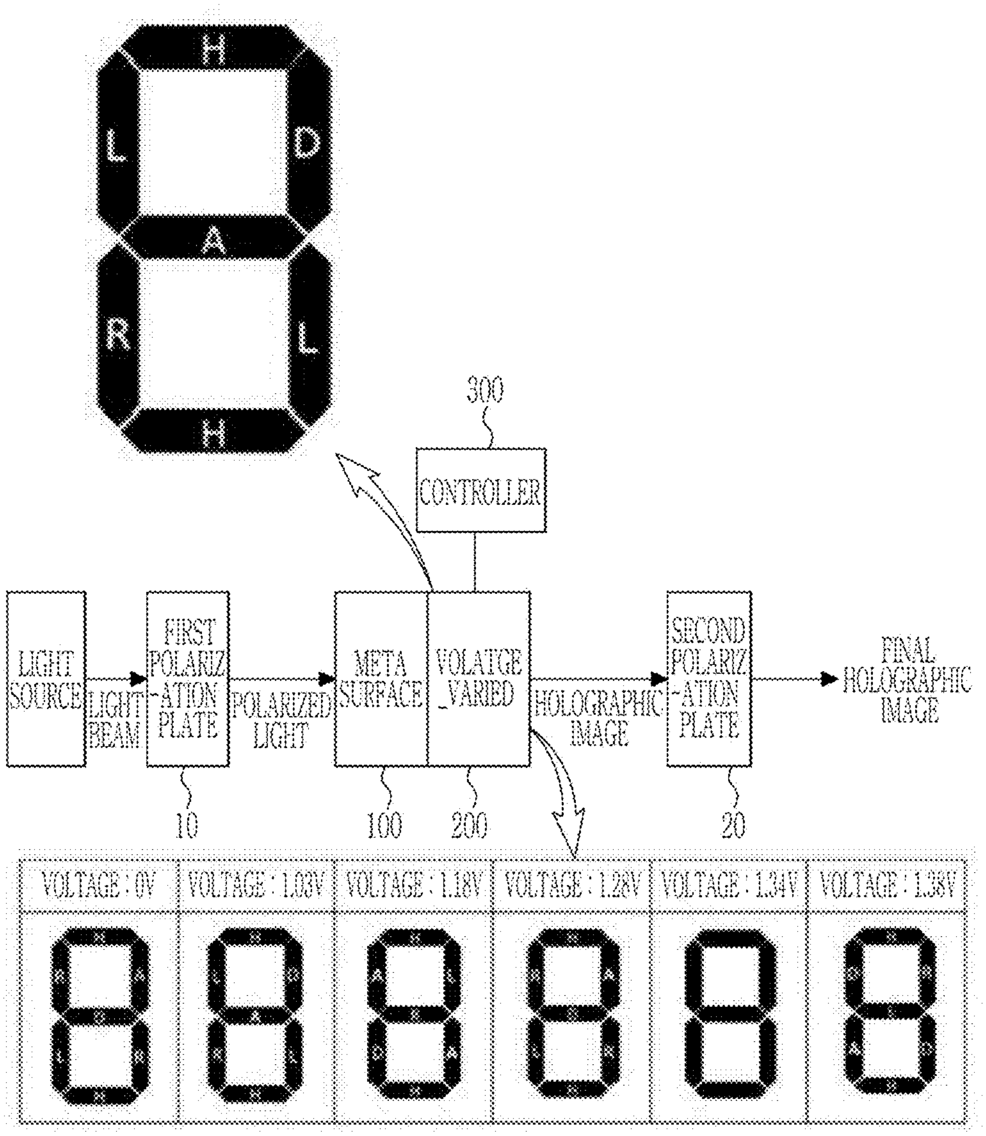
FIG. 12A and FIG. 12B are schematic diagrams illustrating a method for creating a holographic image by a light modulating device according to an embodiment.
Figure 12B:
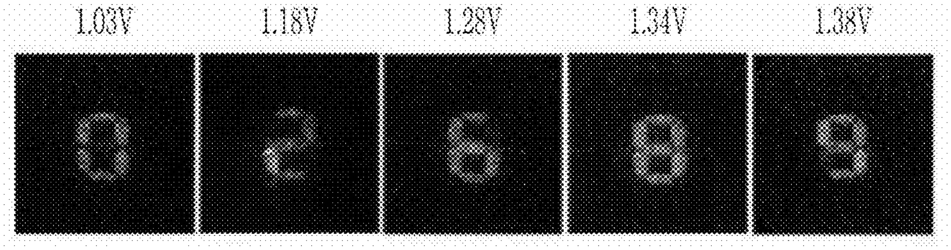
Figure 13:
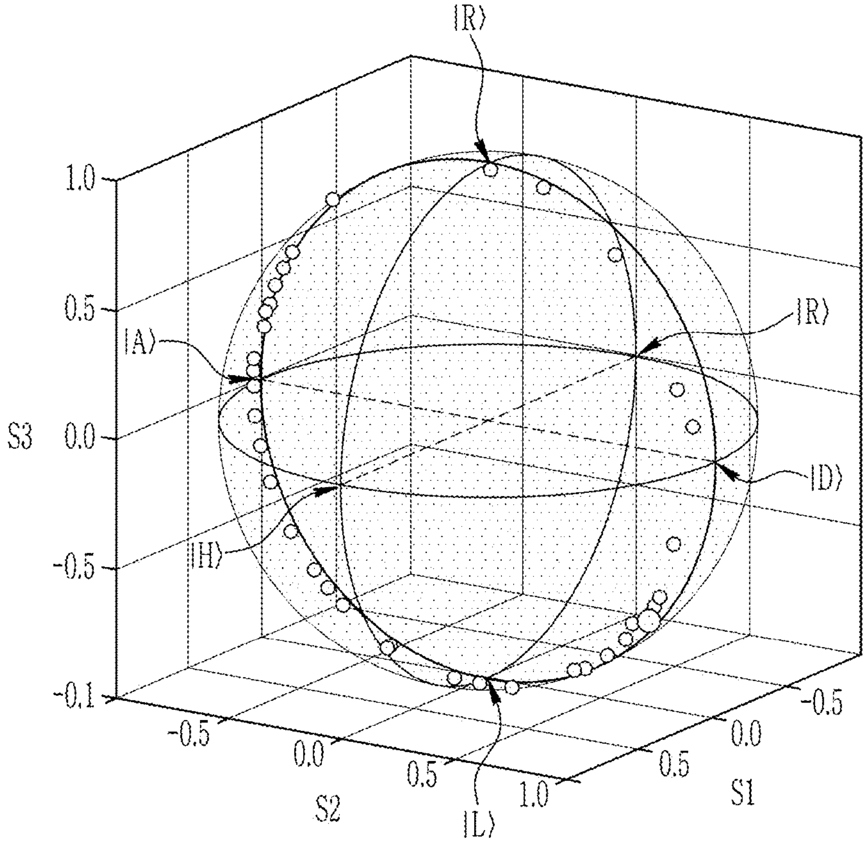
FIG. 13 is a diagram illustrating a polarization state selected for a holographic image according to an embodiment.

FIG. 12A and FIG. 12B are schematic diagrams illustrating a method for creating a holographic image by a light modulating device according to an embodiment and FIG. 13 is a diagram illustrating a polarization state selected for a holographic image according to an embodiment.

Referring to FIG. 12A, a light beam output from a light source such as a laser may pass through the first polarizing plate 10 and reach the metasurface 100. The first polarizing plate 10 may be a 0° linear polarizing plate, and thus, a light beam incident to the metasurface 100 through the first polarizing plate 10 may include both the RCP component and the LCP component. The light beams incident on the metasurface 100 through the first polarizing plate 10 may then form a holographic image.

The metasurface 100 according to an embodiment may create the holographic image including a plurality of partial images having different polarization states. The polarization state of a partial image may be determined by the pixels in the same position in each superpixel. Alternatively, the polarization state of the partial image may be determined by the pixels that identically modulate the polarization state of the light beam.

Referring to FIG. 12A, a light beam incident on the metasurface 100 may be converted into a 7-segment holographic image by the metasurface 100. Each segment may be one partial image having different polarization states. Each segment may correspond to one polarization state and referring to FIG. 12B, holographic images of numbers 0, 2, 6, 8, and 9 may be created using five polarization states.

Referring to FIG. 13, the five polarization states used to create the holographic image may be ket-D (|D>), ket-R (|R>), ket-A (|A>), ket-L (|L>), and ket-H (|H>), respectively.

A point on the S2-S3 plane on the Poincaré sphere is chosen because the voltage-varied liquid crystal (LC) 200 according to an embodiment modulates the polarization state on the S2-S3 plane, which will be described in detail below.

Referring to FIG. 9 and FIG. 13, ket-D may correspond to point VI on the Poincaré sphere that modulates the polarization state of the light beam to 45° linearly polarized light. Ket-R may correspond to point VII on the Poincaré sphere that modulates the polarization state of the light beam to circular polarization in the counterclockwise direction. Ket-A may correspond to point V on the Poincaré sphere that modulates the polarization state of the light beam to 135° linearly polarized light. Ket-L may correspond to point VIII on the Poincaré sphere that modulates the polarization state of the light beam to circular polarization in the clockwise direction. Ket-H may correspond to point IX on the Poincaré sphere that linearly polarizes the polarization state of a light beam to 0°.

Referring to FIG. 12A, each segment in the 7-segment holographic image may be formed by the light beams having different polarization states. That is, light beams having different polarization states may form each part of the holographic image. The polarization state of each segment of the holographic image in FIG. 12A may be ket-H (horizontal segment at the top, first segment), ket-D (vertical segment at the top right, second segment), ket-L (bottom right vertical segment, third segment), ket-H (bottom horizontal segment, fourth segment), ket-R (bottom left vertical segment, fifth segment), ket-L (top left vertical segment, sixth segment), and ket-A (middle horizontal segment, seventh segment).

Each part of the holographic image output from the metasurface 100 according to an embodiment may have different polarization states and each part of the holographic image may be created according to the polarization state of each pixel in the superpixel. For example, when one pixel each included in the plurality of superpixels modulates the light beam into a 45° linearly polarized light, other pixels having the same phase information as the pixel among the pixels included in the plurality of superpixels may create a second segment with the polarization state of ket-D. This is because the polarization state of the second segment corresponds to point VI on the Poincaré sphere and the polarization direction of point VI on the Poincaré sphere is 45° linear polarization. That is, a pixel for creating one hologram in each of the plurality of superpixels may create a part having the same polarization state in the holographic image. The pixels that modulate the same polarization state in the plurality of superpixels may be randomly positioned in each superpixel. This is because high-order diffraction may occur, which causes unintended distortion on the holographic image, if the positions of pixels corresponding to the same polarization state are all the same in the superpixel. When the positions of the pixels that modulates the light beams of the same polarization state in the superpixel are randomly distributed, the effect of higher order diffraction may be reduced or removed from the holographic image.

Then, according to an embodiment, the holographic image created by the metasurface 100 may pass through the voltage-varied LC 200, and at this time, the voltage-varied LC 200 may modulate the polarization state of the holographic image generated by the metasurface 100 according to the magnitude of the voltage. The controller 300 may supply a voltage of the predetermined magnitude to the voltage-varied LC 200. The holographic image of which polarization state is modulated by the voltage-varied LC 200 and the controller 300 may be generated as a final holographic image after passing through the second polarizing plate 20.

The voltage-varied LC 200 according to an embodiment may modulate the polarization state of the holographic image on the S2-S3 plane of the Poincaré sphere according to the magnitude of the supplied voltage. For example, the voltage-varied LC 200 according to an embodiment may modulate the polarization state of a light beam corresponding to point VI on a Poincaré sphere to the polarization states corresponding to point I, point II, point III, point IV, point V, point VI, point VII, or point VIII. The light beam having the polarization state corresponding to point IX (i.e., polarization state of ket-H) may not be modulated by the voltage-varied LC 200.

The second polarizing plate 20 according to an embodiment may be a linear polarizing plate that allow the predetermined linearly polarized light to penetrate. For example, when the second polarizing plate 20 is a 45° polarizing plate in a vertical relationship with 135° linear polarization, a light beam having a polarization state of point V on the Poincaré sphere may be blocked by the second polarizing plate 20. Among the holographic images output from the voltage-varied LC 200, the light beam having the ket-A polarization state may be blocked by the second polarizing plate 20.

According to another embodiment, a plurality of second polarizing plates having different polarization states may be used to generate the holographic image. That is, by positioning the plurality of second polarizing plates 20 following the light modulating device (i.e., between the light modulating device and the screen at the area of interest), various types of holographic images may be generated.

Figure 14A:
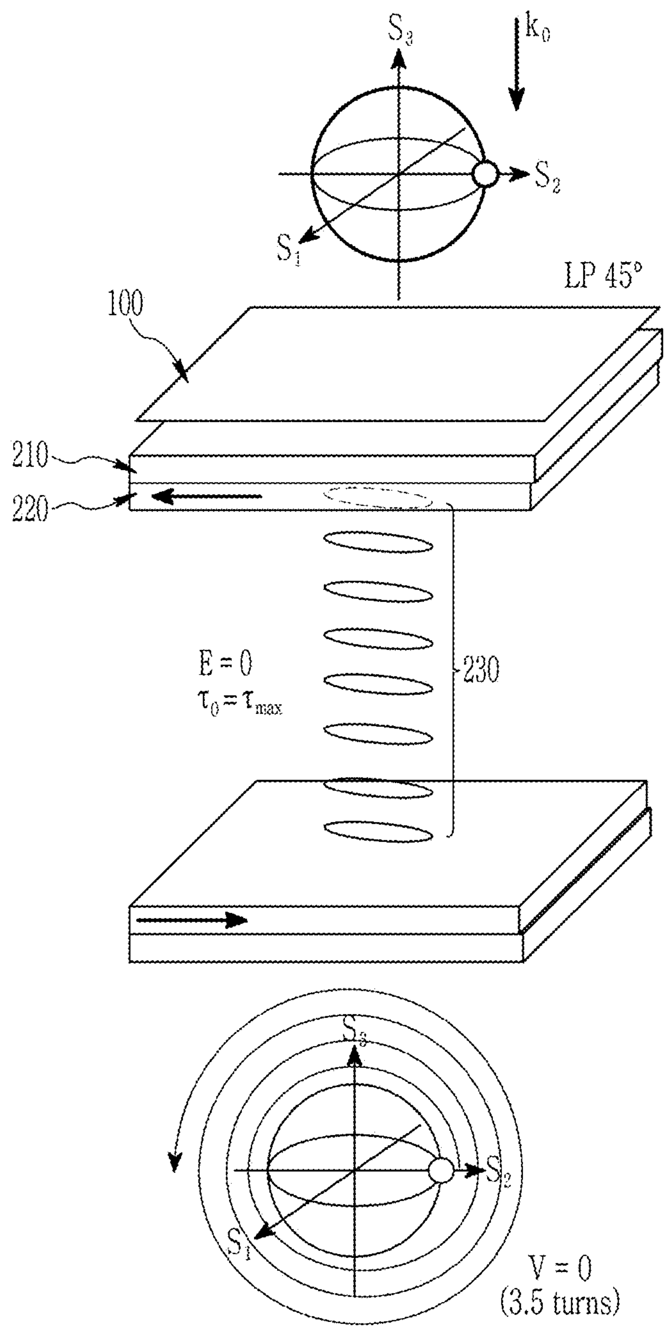
FIG. 14A and FIG. 14B are schematic diagrams illustrating a method for modulating a polarization state by a voltage-varied LC according to an embodiment.
Figure 14B:
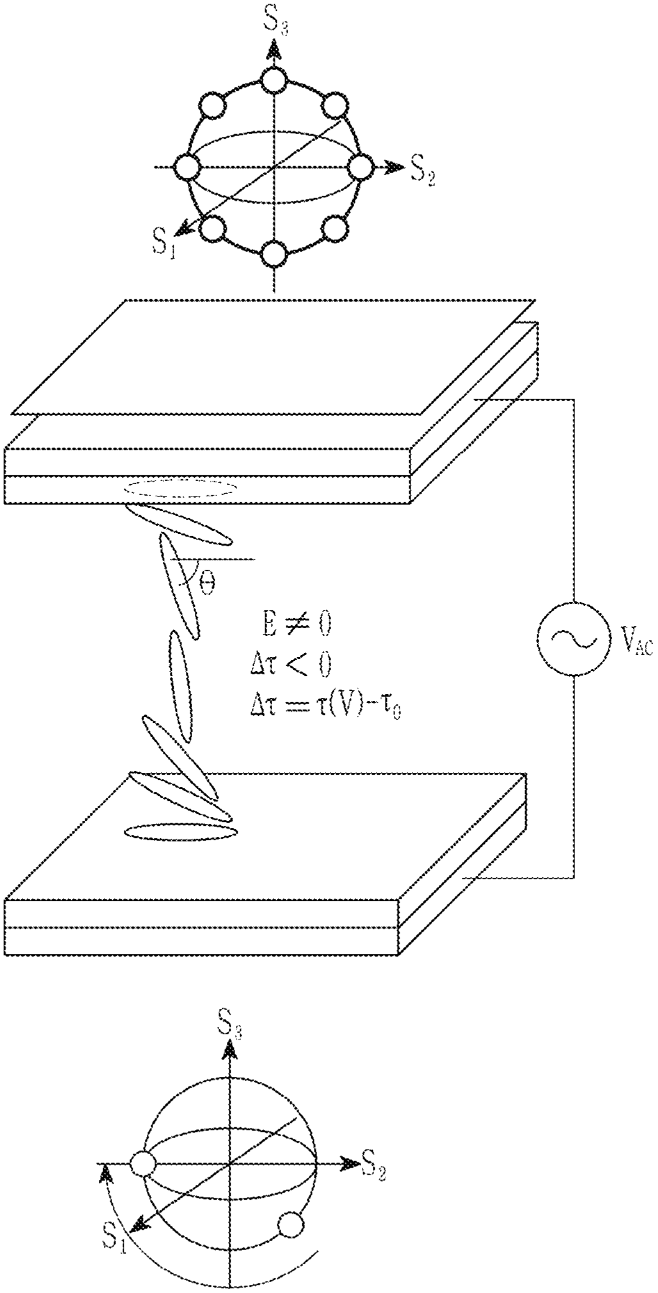

FIG. 14A and FIG. 14B are schematic diagrams illustrating a method for modulating a polarization state by a voltage-varied LC according to an embodiment.

The voltage-varied LC 200 according to an embodiment may include a transparent substrate 210, an alignment layer 220, and an LC layer 230 and may be connected to the controller 300 so that a voltage having predetermined magnitude is supplied to the voltage-varied LC 200 by the controller 300. The voltage-varied LC 200 may modulate the polarization state of the light beam incident on the voltage-varied LC 200 according to the magnitude of the voltage supplied to the voltage-varied LC 200 by the controller 300. Equation 6 below represents the phase delay value according to the effective refractive index of the voltage-varied LC 200.

$$\tau = \int_0^d \frac{2\pi\Delta n_{eff}(z)}{\lambda} dz \quad \text{(Equation 6)}$$

In equation 6, $\tau$ is the phase difference between 0° linear polarization and 90° linear polarization and may represent the phase delay value. In equation 6, $\tau$ may be calculated through the integration of $\Delta n_{eff}$ in the z direction, which may be expressed as a function of the variable z. $\Delta n_{eff}$ may indicate an effective refractive index of the LC.

$\Delta n_{eff}$ of a liquid crystal molecule with rotation angle $\theta$ on the z-axis may be calculated as in Equation 7 below from an ordinary refractive index $n_o$ and an extraordinary refractive index $n_e$ of the liquid crystal which is a birefringent material.

$$\Delta n_{eff} = \frac{n_o n_e}{\sqrt{n_o^2 \cos^2\theta + n_e^2 \sin^2\theta}} - n_0 \quad \text{(Equation 7)}$$

Referring to FIG. 14A, the polarization state of the holographic image passing through the voltage-variable LC 200 to which no voltage is supplied may rotate 3.5 turns in the clockwise direction (maximum phase delay value). Referring to FIG. 14A, since voltage is not supplied to the voltage-varied LC 200 ($V_{AC}$=0), the rotation angle θ of all liquid crystal molecules in the LC layer 230 on the z-axis is 0. Therefore, when no voltage is supplied to the voltage-varied LC 200, $\Delta n_{eff}$ is $n_e - n_o$. According to an embodiment, when the liquid crystal cell type of the voltage-varied LC 200 is a 5CB liquid crystal molecule and the operation wavelength is 532 nm, $\Delta n_{eff}$ at $V_{AC}$=0 may be 0.1884.

Referring to FIG. 14B, when the controller 300 supplies voltages to the voltage-variable LC 200, the liquid crystal molecules in the liquid crystal layer 230 rotate on the z-axis according to the magnitude of the voltage and accordingly, the phase difference between the 0° linear polarization and the 90° linear polarization may be determined. The phase difference between the 0° linear polarization and the 90° linear polarization may modulate the polarization state of the light beam incident to the voltage-varied LC 200 onto the S2-S3 plane of the Poincaré sphere. The voltage magnitude corresponding to the intended phase difference may be experimentally determined.

Referring to 12A, the polarization state of the holographic image passing through the voltage-varied LC 200 where no voltage is supplied ($V_{AC}$=0V) may be modulated by π [rad] (result of 3.5 rotation) in the counterclockwise direction. Accordingly, the ket-L state may be modulated into the ket-R state and the ket-R state may be modulated into the ket-L state by the voltage-varied LC 200. Also, the ket-D state may be modulated into the ket-A state, and the ket-A state may be modulated into the ket-D state by the voltage-varied LC 200. Referring to FIG. 12A, since the polarization state of the second segment of the holographic image output from the voltage-varied LC 200 is ket-A, then the second segment in the holographic image is blocked by the second polarizing plate 20 and the holographic image finally displayed may represent numbered 6.

When the controller 300 supplies a voltage of 1.03V to the voltage-varied LC 200, the polarization state may be rotated by 2rπ[rad] (r is an integer greater than or equal to 0) in the counterclockwise direction. Therefore, the polarization state of the holographic image output from the metasurface 100 may not be changed. Referring to FIG. 12A, since the polarization state of the seventh segment of the holographic image output from the voltage-varied LC 200 is ket-A, then the seventh segment in the holographic image is blocked by the second polarizing plate 20 and the holographic image finally displayed may represent numbered 0.

When the controller 300 supplies a voltage of 1.18 V to the voltage-varied LC 200, the polarization state may rotate on the S2-S3 plane of the Poincaré sphere by 2rπ+3π/2 [rad] in the counterclockwise direction. Accordingly, the ket-L state may be modulated into the ket-A state, and the ket-R state may be modulated into the ket-D state by the voltage-varied LC 200. Also, the ket-D state may be modulated into the ket-L state, and the ket-A state may be modulated into the ket-R state by the voltage-varied LC 200. Referring to FIG. 12A, since the polarization state of the third and sixth segments of the holographic image output from the voltage-varied LC 200 is ket-A, the third and sixth segments in the holographic image may be blocked by the second polarizing plate 20 and the holographic image finally displayed may represent numbered 2.

When the controller 300 supplies a voltage of 1.28V to the voltage-varied LC 200, the polarization state may rotate on the S2-S3 plane of the Poincaré sphere by 2rπ+π [rad] in the counterclockwise direction. Accordingly, the ket-L state may be modulated into the ket-R state, and the ket-R state may be modulated into the ket-L state by the voltage-varied LC 200. Also, the ket-D state may be modulated into the ket-A state, and the ket-A state may be modulated into the ket-D state by the voltage-varied LC 200. Referring to FIG. 12A, since the polarization state of the second segment of the holographic image output from the voltage-varied LC 200 is ket-A, then the second segment in the holographic image may be blocked by the second polarizing plate 20 and the holographic image finally displayed may represent numbered 6.

When the controller 300 supplies a voltage of 1.34V to the voltage-varied LC 200, the polarization state may rotate on the S2-S3 plane of the Poincaré sphere by 2rπ+ω [rad] in the counterclockwise direction. Here, w may not be a multiple of π/2. Therefore, each polarization state of the holographic image may be modulated to points other than points I to VIII on the S2-S3 plane of the Poincaré sphere shown in FIG. 9. Since the polarization state corresponding to ket-A does not exist in the holographic image output from the voltage-varied LC 200, all 7 segments of the holographic image may be displayed without being blocked by the second polarizing plate 20 (i.e., the number 8 is output).

When the controller 300 supplies a voltage of 1.38V to the voltage-varied LC 200, the polarization state may rotate on the S2-S3 plane of the Poincaré sphere by 2rπ+π/2 [rad] in the counterclockwise direction. Accordingly, the ket-L state may be modulated into the ket-D state and the ket-R state may be modulated into the ket-A state by the voltage-varied LC 200. Also, the ket-D state may be modulated into the ket-R state and the ket-A state may be modulated into the ket-L state by the voltage-varied LC 200. Referring to FIG. 12A, since the polarization state of the fifth segment of the holographic image output from the voltage-varied LC 200 is ket-A, the fifth segment is blocked by the second polarizing plate 20 and the holographic image finally displayed may represent numbered 9.

The controller 300 according to another embodiment may individually control polarization directions of a plurality of second polarizing plates 20. For example, when the controller 300 supplies 1.28V to the voltage-varied LC 200, the controller 300 may control the polarization direction of one second polarizing plate 20 to 45° and block the LCP component of the polarization state using another second polarizing plate 20, so that a holographic image of the number 5 may be created.

Figure 15:
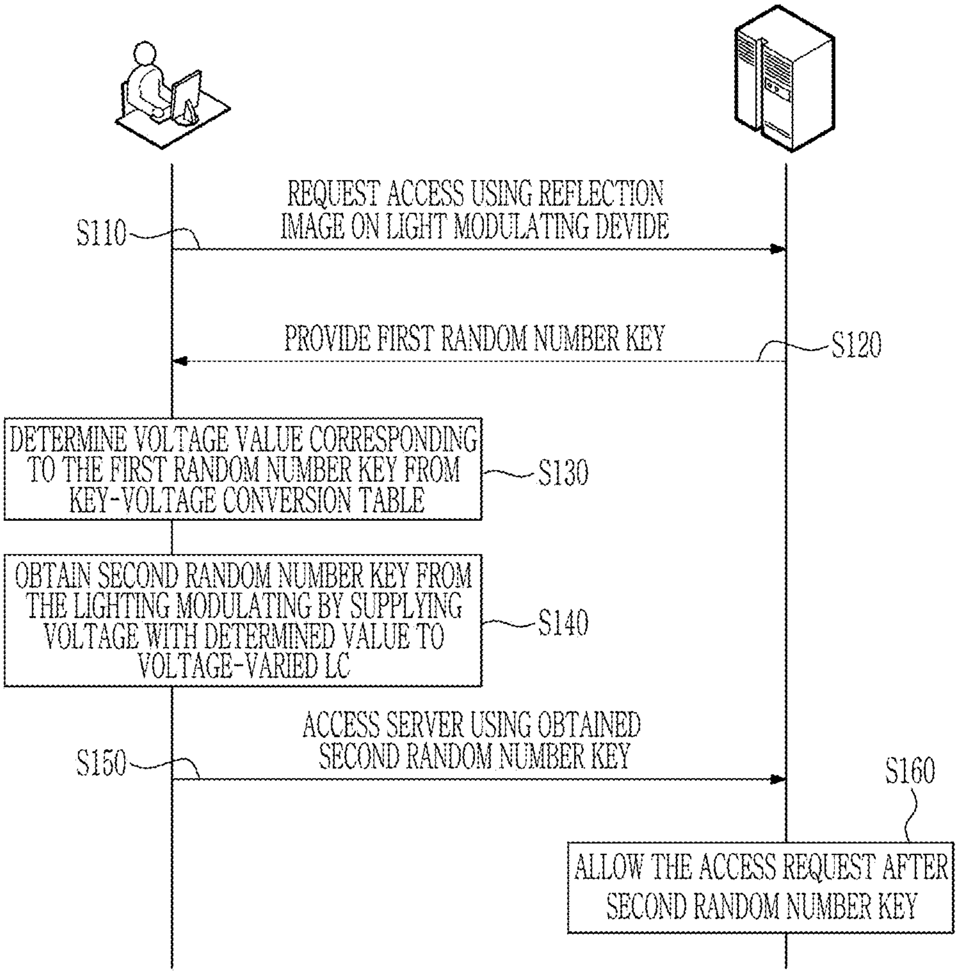
FIG. 15 is a flowchart illustrating a method for securing access using a light modulating device according to an embodiment.

FIG. 15 is a flowchart illustrating a method for securing access using a light modulating device according to an embodiment.

For example, a user possessing a lighting modulation device may perform secure access to a server using a reflection image of the light modulating device and a holographic image output from the light modulating device.

Referring to FIG. 15, the user may request access to a server using a reflection image on the light modulating device (S110). The light modulating device may be possessed by the user and may be mounted in a plastic card or included in an electronic device capable of supplying a voltage. When the light modulating device is included in the plastic card, the user may apply a laser to the light modulating device and supply voltage using a separate control device. When the light modulating device is included in an electronic device capable of supplying voltage, the electronic device may transmit a laser to the light modulating device and supply voltage through a laser generator and voltage supply device in the electronic device.

The reflection image of the light modulating device according to an embodiment may represent a one-dimensional code (e.g., linear barcode) or a two-dimensional code (e.g., quick response (QR) code), and the user performs image recognition by using a user terminal, it is possible to access the server access page linked by the reflection image of the light modulating device. When the reflection image of the light modulating device according to an embodiment is represented by a plurality of colors, the user recognizes a code of a specific color using the user terminal and based on the recognition result of the code, the user may request the access to the server using the user terminal. The user terminal may request the access to the server through a wired or wireless network. The color of the code to be recognized by the user to request the access may be determined in advance between the user terminal and the server.

The server receiving the access request from the user terminal may provide a first random number key to the user terminal (S120).

For example, the code of the reflection image on the light modulating device may include an identifier of the light modulating device that distinguishes each light modulating device, and when the user terminal requests access to the server using the code of the reflection image, the identifier of the light modulating device may be transmitted to the server.

The first random number key according to an embodiment may be an arbitrary number string or character determined by the server and may be used to determine a voltage value to be supplied to the voltage-varied LC 200 of the light modulating device.

The user terminal may determine a voltage value corresponding to the first random number key from the key-voltage conversion table (S130). The key-voltage conversion table may indicate a correspondence between the first random number key and the voltage value. Table 2 below is an example of the key-voltage conversion table showing the correspondence between key numbers and voltage values.

TABLE 2

| first random number key | 1 | 2 | 3 | 4 | 5 |
|---|---|---|---|---|---|
| voltage value (V) | 1.03 | 1.18 | 1.28 | 1.34 | 1.38 |

The server according to an embodiment may transmit a key-voltage conversion table to the user terminal in advance before receiving the access request from the user terminal. The key-voltage conversion table transmitted to the user terminal may be periodically/non-periodically updated by the server. For example, referring to table 1, when the server delivers '3145' as the first random number key to the user terminal, the user terminal may determine '1.28, 1.03, 1.34, 1.38' as the voltage value corresponding to the first random number key based on the key-voltage conversion table and sequentially supply the determined voltage values '1.28, 1.03, 1.34, 1.38' to the voltage-varied LC 200.

The user terminal may obtain a second random number key from the light modulating device by supplying the determined voltage value to the voltage-varied LC 200 (S140). Referring to above FIG. 12B, when the controller 300 supplies 1.28V corresponding to '3' of the first random number key to the voltage-varied LC 200, a holographic image of the number 6 may be output from the light modulating device. Then, when the controller 300 supplies voltage values 1.03V, 1.34V, and 1.38V corresponding to '1', '4', and '5' of the first random number key to the voltage-varied LC 200, the holographic image of the numbers 0, 8, and 9 may be output from the light modulating device. Therefore, according to an embodiment, the user terminal may determine the second random number key '6089' generated by the light modulating device by applying the voltage value determined from the key-voltage conversion table to the voltage-varied LC 200.

Thereafter, the user terminal may access the server using the second random number key determined by using the light modulation device (S150) and the server may determine whether to allow the access request of the user terminal by checking the second random number key (S160).

The server may store a pair of the first random number key and the second random number key corresponding to each light modulating device and grant the access request by matching the first random number key transmitted to the user who has the light modulating device with a specific identifier and the second random number key received from the user corresponding to the first random number key. In the example described above, before transmitting the first random number key '3145' to the user terminal, the server may know in advance that the second random number key '6089' will be output by the light modulating device when voltage values 1.28V, 1.03V, 1.34V, and 1.38V corresponding to the first random number key '3145' are applied to the light modulating device. Accordingly, the server may determine whether to approve the access request of the user by confirming whether the second random number key corresponding to the first random number key is received from the user terminal after transmitting the first random number key to the user terminal.

As described above, it is possible to achieve a larger information storage capacity and provide an access method with a high level of security by using the light modulation device with a high degree of freedom in terms of adjustable light characteristics. In addition, by being combined with various IoT devices, it is possible to implement a security device that cannot be counterfeited. Alternatively, when the light modulating device described above is coupled to a plastic card or banknote, the light modulating device may also be used to prevent counterfeiting of the plastic card or banknote through printed electronics technology.

Figure 16:
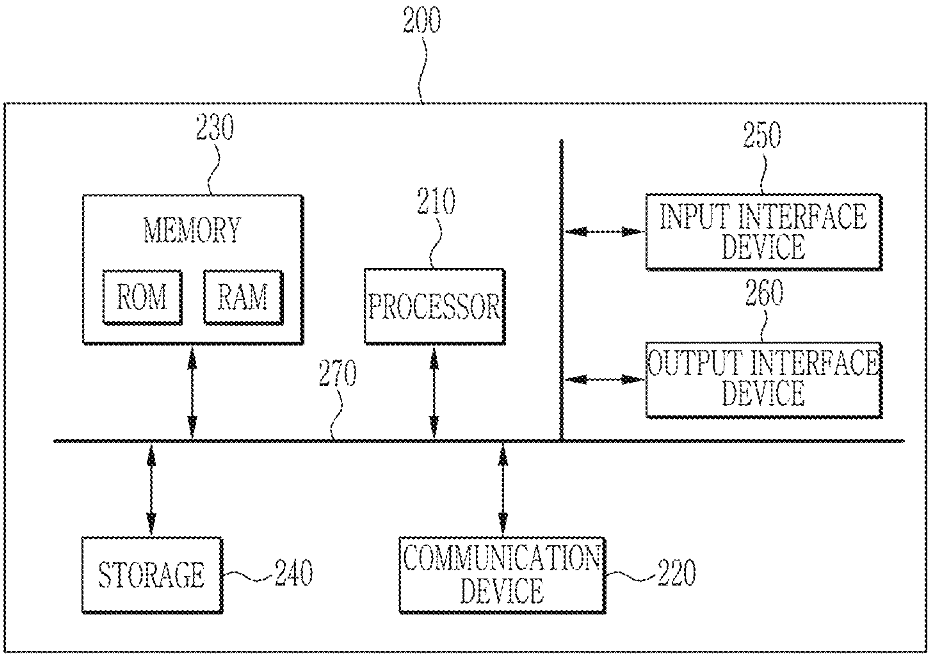
FIG. 16 is a block diagram illustrating a user terminal according to an embodiment.

FIG. 16 is a block diagram illustrating a user terminal according to an embodiment.

The user terminal according to an embodiment may be implemented as a computer system, for example, a computer-readable medium. Referring to FIG. 16, the computer system 200 may include at least one of a processor 210, a memory 230, an input interface device 250, an output interface device 260, and a storage device 240 communicating through a bus 270. The computer system 200 may also include a communication device 220 coupled to the network. The processor 210 may be a central processing unit (CPU) or a semiconductor device that executes instructions stored in the memory 230 or the storage device 240. The memory 230 and the storage device 240 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 220 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An apparatus for creating a holographic image, the apparatus comprising:

a first polarizing plate;

a metasurface configured to create a first holographic image by modulating a polarization state of a light beam passing through the first polarizing plate;

a controller configured to supply voltage to a voltage-varied liquid crystal (LC); and the voltage-varied LC configured to create a second holographic image by modulating a polarization state of the first holographic image according to the voltage, wherein a plurality of superpixels in the metasurface layer is composed of the plurality of meta-atoms, and each of the plurality of superpixels includes a plurality of pixels, wherein each of the plurality of pixels includes a first meta-atom group and/or a second meta-atom group, wherein the first meta-atom group modulates the polarization state of the light beam from left-circular polarization (LCP) to right-circular polarization (RCP) and the second meta-atom group modulates the polarization state of the light beam from the RCP to the LCP, wherein meta-atoms in the first meta-atom group are rotated in clockwise CW direction with respect to neighboring meta-atoms and meta-atoms in the second meta-atom group are rotated in counter-clockwise CCW direction with respect to neighboring meta-atoms, and wherein the polarization state of the first holographic image is determined based on a rotation angle of the plurality of meta-atoms and a ratio of the first meta-atom group and the second meta-atom group included in the plurality of pixels.

2. The apparatus of claim 1, wherein:

the first polarizing plate is a 0° polarizing plate that modulates a polarization state of a light beam to have both a right-circular polarization (RCP) component and a left circular polarization (LCP) component.

3. The apparatus of claim 1 further comprising a second polarizing plate configured to block the second holographic image according to a polarization state of the second holographic image.

4. The apparatus of claim 3, wherein:

when the metasurface generates a plurality of first holographic images, the second polarizing plate blocks at least one second holographic image among a plurality of second holographic images generated through modulation of polarization states of the plurality of first holographic images or does not block the plurality of second holographic images.

5. The apparatus of claim 1, wherein:

the metasurface refracts a light beam of which a polarization state is modulated into an area of interest and the second holographic image is formed in the area of interest.

6. The apparatus of claim 1, wherein:

each of the plurality of pixels modulates the light beam into a different polarization state.

7. The apparatus of claim 1, wherein:

when a voltage having a predetermined magnitude is provided by the controller to the voltage-varied LC, the voltage-varied LC modulates a polarization state of the first holographic image on a plane of a Poincaré sphere.

8. A light modulating device, comprising:

a substrate configured to support a plurality of meta-atoms;

a metasurface layer disposed on the substrate configured to include the plurality of meta-atoms; and a voltage-varied liquid crystal (LC) configured to modulate a polarization state of a holographic image generated by light beams passing through the plurality of meta-atoms wherein the device further comprises;

a plurality of superpixels in the metasurface layer that is composed of the plurality of meta-atoms, wherein each of the plurality of superpixels includes a plurality of pixels, and the plurality of pixels determines a polarization state of the light beam and phase information of the light beam, respectively, wherein the plurality of pixels includes a first meta-atom group and/or a second meta-atom group, respectively, and a size of a meta-atom included in the first meta-atom group is different from a size of a meta-atom included in the second meta-atom group, wherein the first meta-atom group modulates the polarization state of the light beam from left-circular polarization (LCP) to right-circular polarization (RCP) and the second meta-atom group modulates the polarization state of the light beam from the RCP to the LCP, wherein meta-atoms in the first meta-atom group are rotated in clockwise CW direction with respect to neighboring meta-atoms and meta-atoms in the second meta-atom group are rotated in counter-clockwise CCW direction with respect to neighboring meta-atoms, wherein the polarization state of the holographic image is determined based on a rotation angle of the plurality of meta-atoms and a ratio of the first meta-atom group and the second meta-atom group included in the plurality of pixels.

9. The device of claim 8, wherein:

a first superpixel and a second superpixel of the plurality of superpixels includes a first pixel that equally modulates a polarization state of the light beam, respectively.

10. The device of claim 9, wherein:

a location of the first pixel in the first superpixel is different from a location of the first pixel in the second superpixel.

11. The device of claim 8, wherein:

the polarization state is further determined based on phase difference between a phase of a light beam refracted by the first meta-atom group a phase of a light beam refracted by the second meta-atom group.

12. The device of claim 11, wherein:

the phase information is further determined based on the rotation angle of a first meta-atom in the first meta-atom group or a first meta-atom in the second meta-atom group included in the plurality of pixels.

13. The device of claim 8, wherein:

the polarization state corresponds to spherical coordinates on a Poincaré sphere and the plurality of pixels includes the first meta-atom group and the second meta-atom group, and a first coordinate component of the coordinate is determined based on the ratio of a number of the first meta-atom group and the second meta-atom group and a second coordinate component of the coordinate is determined based on a phase difference between a phase of the light beam refracted by the first meta-atom group and a phases of the light beam refracted by the second meta-atom group.

14. The device of claim 8, wherein:

a value of a phase of a first light beam modulated by the first pixel is different from a value of a phase of a second light beam modulated by the second pixel and the first light beam and the second light beam form a single holographic image in an area of interest.

15. The device of claim 8, wherein:

the voltage-varied LC modulates the polarization state of the holographic image generated by the light beam passing through the plurality of meta-atoms based on magnitude of a voltage supplied to the voltage-varied LC.

16. The device of claim 15, wherein:

when a plurality of holographic images is formed by the plurality of pixels, the voltage-varied LC modulates a polarization state of a first holographic image by a first pixel of the plurality of pixels and a polarization state of a second holographic image by a second pixel of the plurality of pixels differently from each other.

* * * * *